US011068217B2

(12) United States Patent
Yamakawa

(10) Patent No.: US 11,068,217 B2
(45) Date of Patent: Jul. 20, 2021

(54) IMAGE FORMING APPARATUS AND CONTROL METHOD

(71) Applicant: SHARP KABUSHIKI KAISHA, Sakai (JP)

(72) Inventor: Toshihiro Yamakawa, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/066,855

(22) Filed: Oct. 9, 2020

(65) Prior Publication Data

US 2021/0109691 A1 Apr. 15, 2021

(30) Foreign Application Priority Data

Oct. 11, 2019 (JP) .............................. JP2019-187586

(51) Int. Cl.
*G06F 3/12* (2006.01)
(52) U.S. Cl.
CPC .......... *G06F 3/1236* (2013.01); *G06F 3/1209* (2013.01)
(58) Field of Classification Search
CPC ............................. G06F 3/1236; G06F 3/1209
USPC ....................................................... 358/1.15
See application file for complete search history.

(56) References Cited

U.S. PATENT DOCUMENTS

| 8,793,369 | B2 * | 7/2014 | Takahashi | .......... H04N 1/32662 |
| | | | | 709/224 |
| 2012/0182572 | A1 * | 7/2012 | Kaneko | .................. G06F 3/1203 |
| | | | | 358/1.15 |
| 2015/0022851 | A1 * | 1/2015 | Kim | ....................... G06F 3/1203 |
| | | | | 358/1.15 |
| 2017/0078516 | A1 * | 3/2017 | Ishizaki | ............. G06Q 30/0283 |
| 2020/0117401 | A1 * | 4/2020 | Shibata | ............... H04N 1/00042 |

FOREIGN PATENT DOCUMENTS

JP 2010-117979 A 5/2010

* cited by examiner

*Primary Examiner* — Allen H Nguyen
(74) *Attorney, Agent, or Firm* — ScienBiziP, P.C.

(57) ABSTRACT

Provide an image forming apparatus including a controller, a communicator that communicates with a management server, and an image former that forms an image. The communicator includes a first communicator and a second communicator, and the controller transmits first information about a use of the image forming apparatus and second information about a state of the image forming apparatus to the management server via the first communicator, and transmits either one of the first information or the second information to the management server via the second communicator if a failure occurs in the first communicator, and transmits the other information via the first communicator if the failure occurring in the first communicator is resolved.

9 Claims, 15 Drawing Sheets

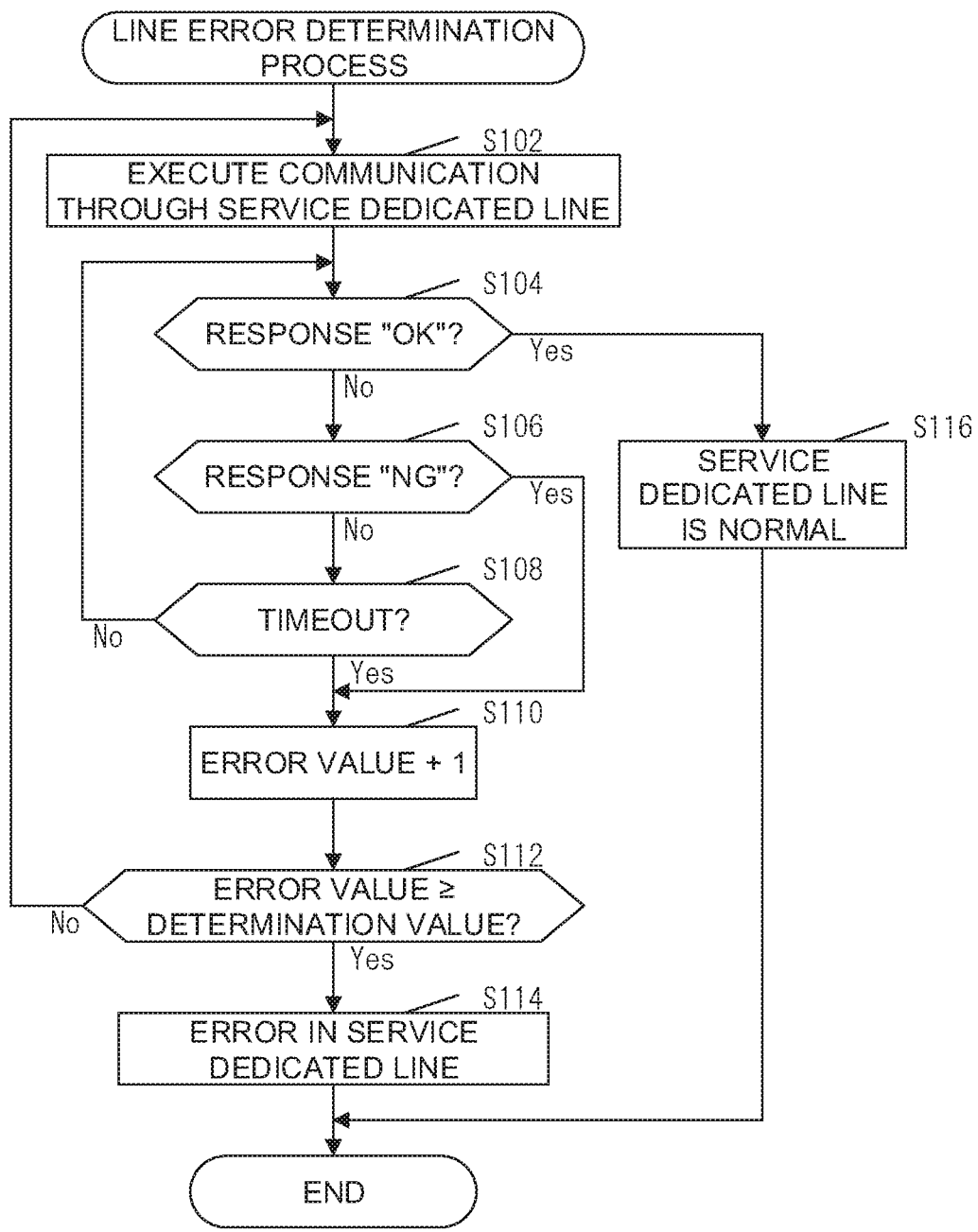

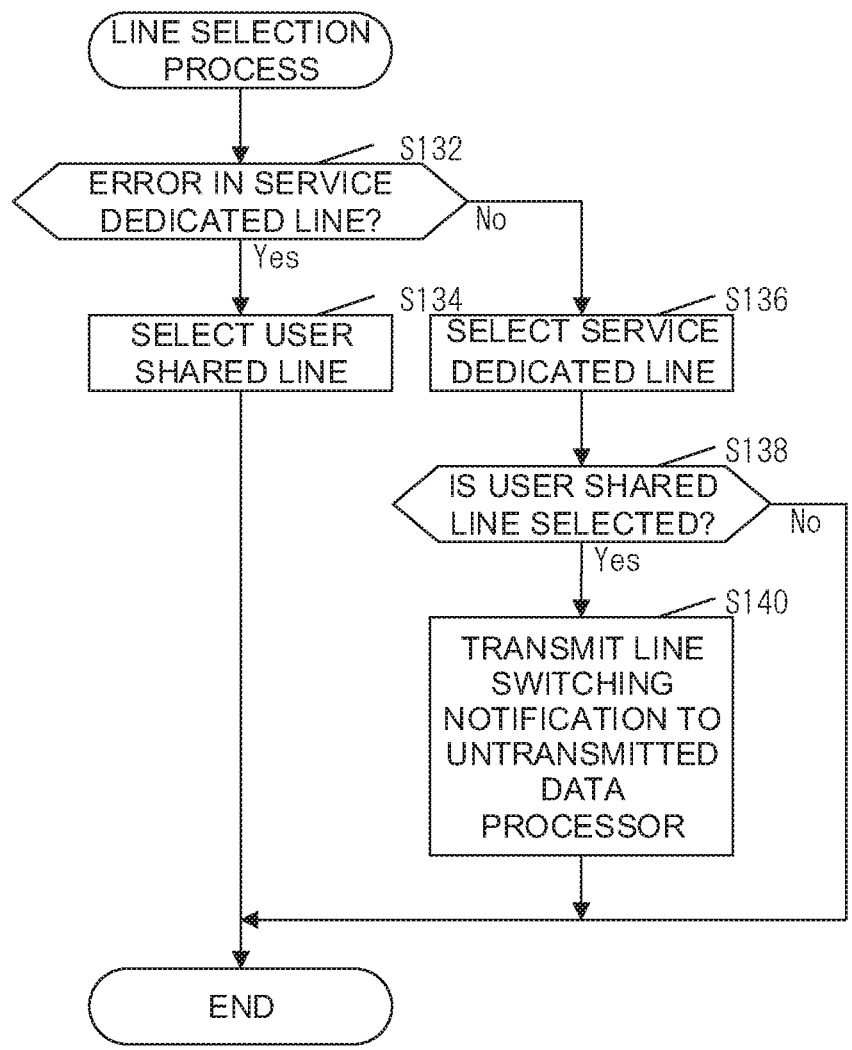

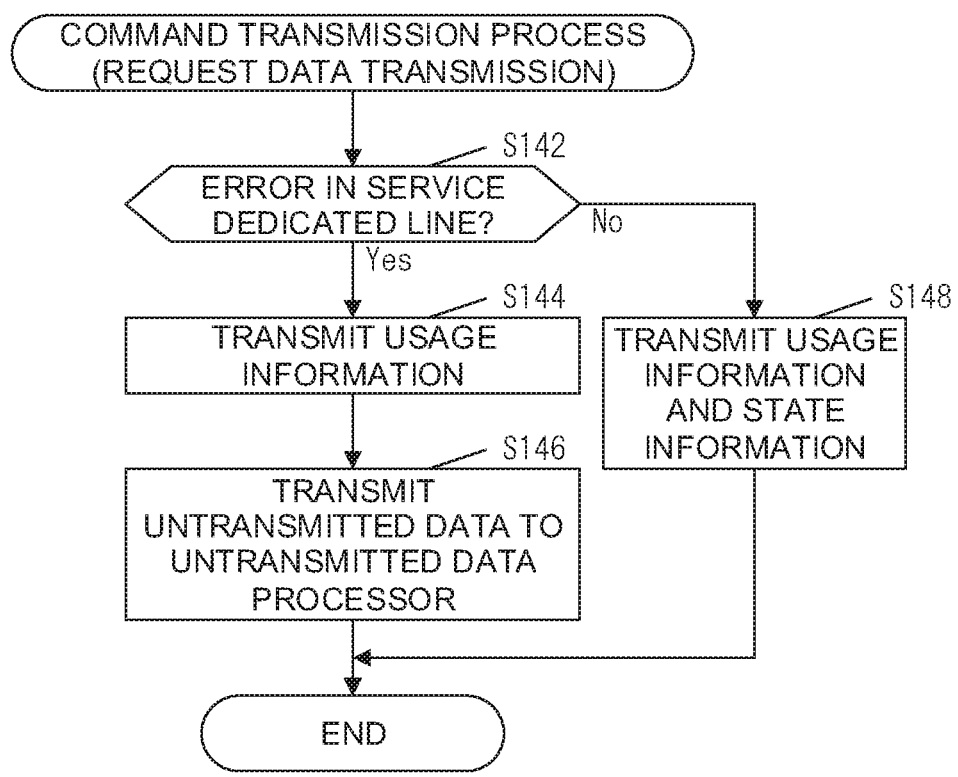

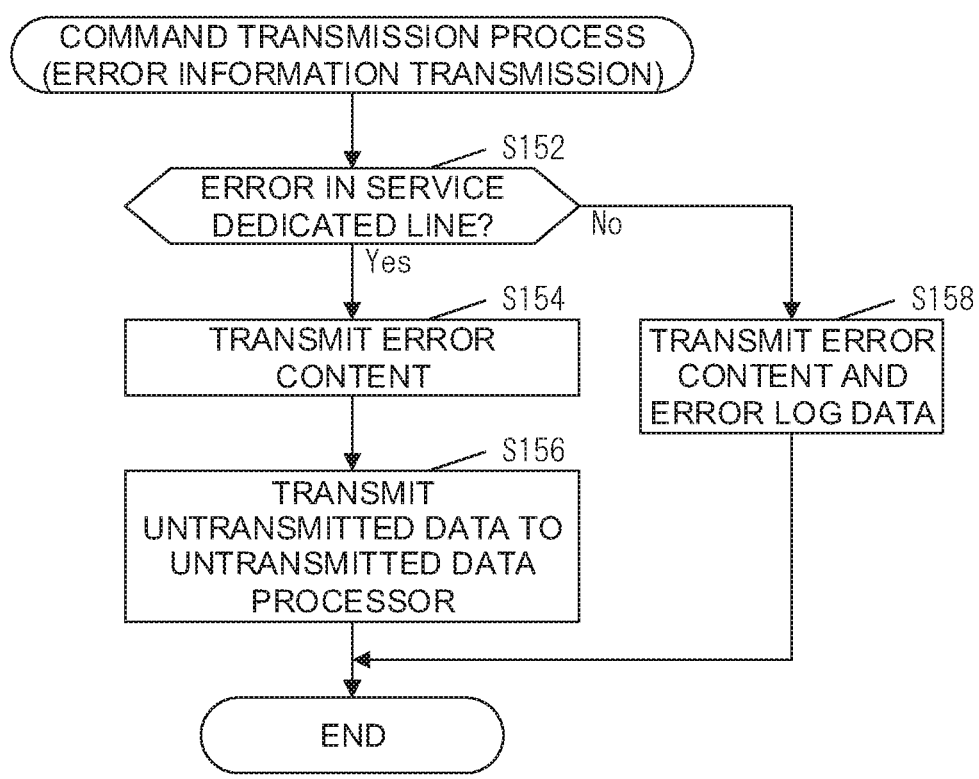

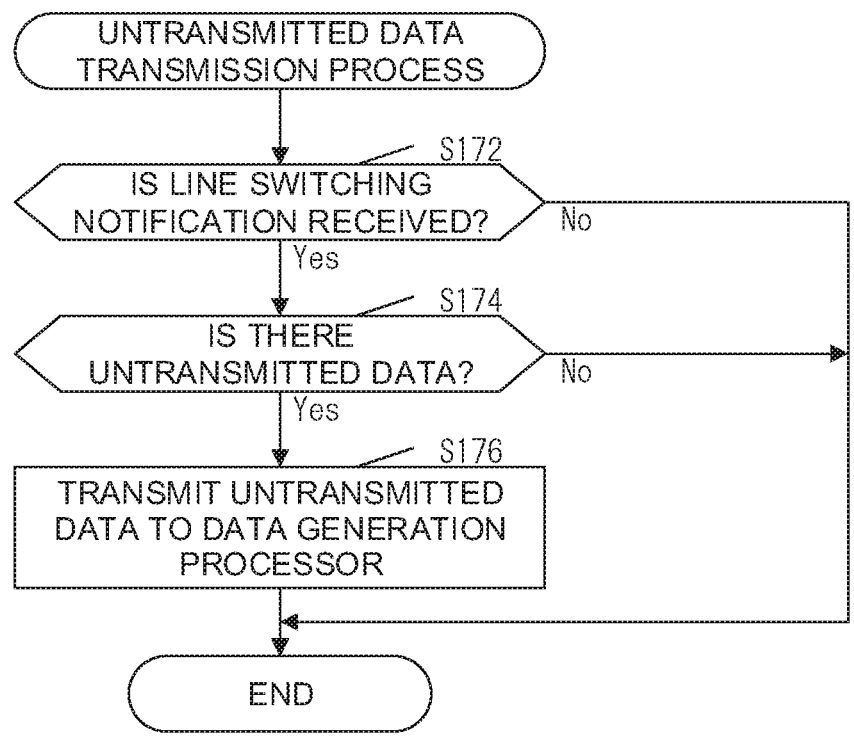

FIG. 8

| TRANSMISSION DATE AND TIME | COMMAND DATA | INFORMATION TYPE | TRANSMISSION DATA | TRANSMISSION RESULT |
|---|---|---|---|---|
| 2019/04/01 11:01:22 | REQUEST DATA | USAGE INFORMATION | [COUNT DATA]<br>82 SHEETS | TRANSMITTED |
| | | STATE INFORMATION | [LOG DATA]<br>PRINT 2019-04-01 11:01:22 A4(tray1)<br>PRINT 2019-04-01 11:01:28 A4(tray1)<br>...<br>[USAGE CONDITION OF EACH COMPONENT]<br>FIXER TRAVEL DISTANCE 40.3m<br><br>[OPERATION INFORMATION]<br>FIXER TEMPERATURE: 160°C | UNTRANSMITTED |
| 2019/04/01 16:41:22 | MACHINE ERROR ALERT | ERROR CONTENT | [DATE AND TIME OF OCCURRENCE]<br>2019/04/01 11:01:22<br>[ERROR TYPE]<br>paper jam | TRANSMITTED |
| | | ERROR LOG DATA | ERROR 2019-04-01 16:41:22 paper jam, tray1<br>... | UNTRANSMITTED |
| ⋮ | ⋮ | ⋮ | ⋮ | ⋮ |

| APPARATUS ID | DATE AND TIME OF OCCURRENCE | MACHINE ERROR TYPE | ERROR LOG DATA |
|---|---|---|---|
| 1 | 2019/04/01 11:01:22 | PAPER JAM | ERROR 2019-04-01 11:01:22 paper jam, tray1 |
| 1 | 2019/04/01 16:41:22 | SERVICE DEDICATED LINE ERROR | — |
| ⋮ | ⋮ | ⋮ | ⋮ |

IMAGE FORMING APPARATUS AND CONTROL METHOD

BACKGROUND OF THE INVENTION

Field of the Invention

The present invention relates to an image forming apparatus, and the like.

Description of the Background Art

In corporations, or the like, a multi-function printer (MFP) is connected to a network such as the Intranet. If a terminal device used by a user of the MFP is connected to a network to which the MIT is connected, it is possible for the user to transmit a job from the terminal device to the MFP.

A technique is proposed for a MFP including a network board connected to a network different from a network such as the Intranet normally used by a user. For example, a technique is proposed in which a job management information base (MIB) generated based on, for example, information about a type and quantity of consumable components is transmitted to an external ordering system via another network different from a network normally used by a user (for example, see Japanese Unexamined Patent Application Publication No. 2010-117979).

However, the above-described technique has a problem that if a failure occurs in the other network different from the network normally used by the user, information such as the information about the type and quantity of the consumable components is not transmitted to the external system, and no consideration is given to handling of the information not transmitted.

In view of the problems described above, an object of the present invention is to provide an image forming apparatus capable of transmitting information not transmitted during occurrence of a failure after the failure in a communicator that transmits the information of the image forming apparatus is resolved.

SUMMARY OF THE INVENTION

To resolve the above-described problems, an image forming apparatus according to the present invention is an image forming apparatus including
a controller, a communicator that communicates with a management server, and an image former that forms an image,
the communicator includes a first communicator and a second communicator, and
the controller
transmits first information about a use of the image forming apparatus and second information about a state of the image forming apparatus to the management server via the first communicator,
transmits either one of the first information or the second information to the management server via the second communicator if a failure occurs in the first communicator, and
transmits the other information via the first communicator if the failure occurring in the first communicator is resolved.

An image forming apparatus according to the present invention is an image forming apparatus including
a controller, a communicator that communicates with a management server, and an image former that forms an image,
the communicator includes a first communicator and a second communicator, and
the controller
transmits an error content of the image forming apparatus and error log data of the image forming apparatus to the management server via the first communicator,
transmits either one of information of the error content of the image forming apparatus or the error log data of the image forming apparatus to the management server via the second communicator if a failure occurs in the first communicator, and
transmits the other information via the first communicator if the failure occurring in the first communicator is resolved. A control method according to the present invention is a method of controlling an image forming apparatus including
a controller, a communicator that communicates with a management server, and an image former that forms an image,
the communicator including a first communicator and a second communicator, the control method including
transmitting first information about a use of the image forming apparatus and second information about a state of the image forming apparatus to the management server via the first communicator,
transmitting either one of the first information or the second information to the management server via the second communicator if a failure occurs in the first communicator, and
transmitting the other information via the first communicator if the failure occurring the first communicator is resolved.

A control method according to the present invention is a method of controlling an image forming apparatus including
a controller, a communicator that communicates with a management server, and an image former that forms an image,
the communicator including a first communicator and a second communicator, the control method including
transmitting an error content of the image forming apparatus and error log data of the image forming apparatus to the management server via the first communicator.
transmitting either one of information of the error content of the image forming apparatus or the error log data of the image forming apparatus to the management server via the second communicator if a failure occurs in the first communicator, and
transmitting the other information via the first communicator if the failure occurring in the first communicator is resolved.

According to the present invention, after a failure of a communicator that transmits information of the forming apparatus is resolved, it is possible to transmit the information not transmitted during the occurrence of the failure.

BRIEF DESCRIPTION OF DRAWINGS

FIG. 3 is a flowchart for describing a flow of a line error determination process according to the first embodiment;

FIG. 4 is a flowchart for describing a flow of a line selection process according to the first embodiment;

FIG. 5 is a flowchart for describing a flow of a command transmission process (request data transmission) according to the first embodiment;

FIG. 6 is a flowchart for describing a flow of a command transmission process (error information transmission) according to the first embodiment;

FIG. 7 is a flowchart for describing a flow of an untransmitted data transmission process according to the first embodiment;

FIG. 8 is a table showing an example of a data configuration of transmission history information according to the first embodiment;

FIG. 10 is a table for describing a data configuration of error information according to the first embodiment;

DESCRIPTION OF THE PREFERRED EMBODIMENTS

Below, an embodiment of the present invention will be described with reference to the drawings. It is noted that in the present embodiment, as an example, a system including an image forming apparatus to which the present invention is applied will be described.

1. First Embodiment

1.1 Overall Configuration

Figure 1:
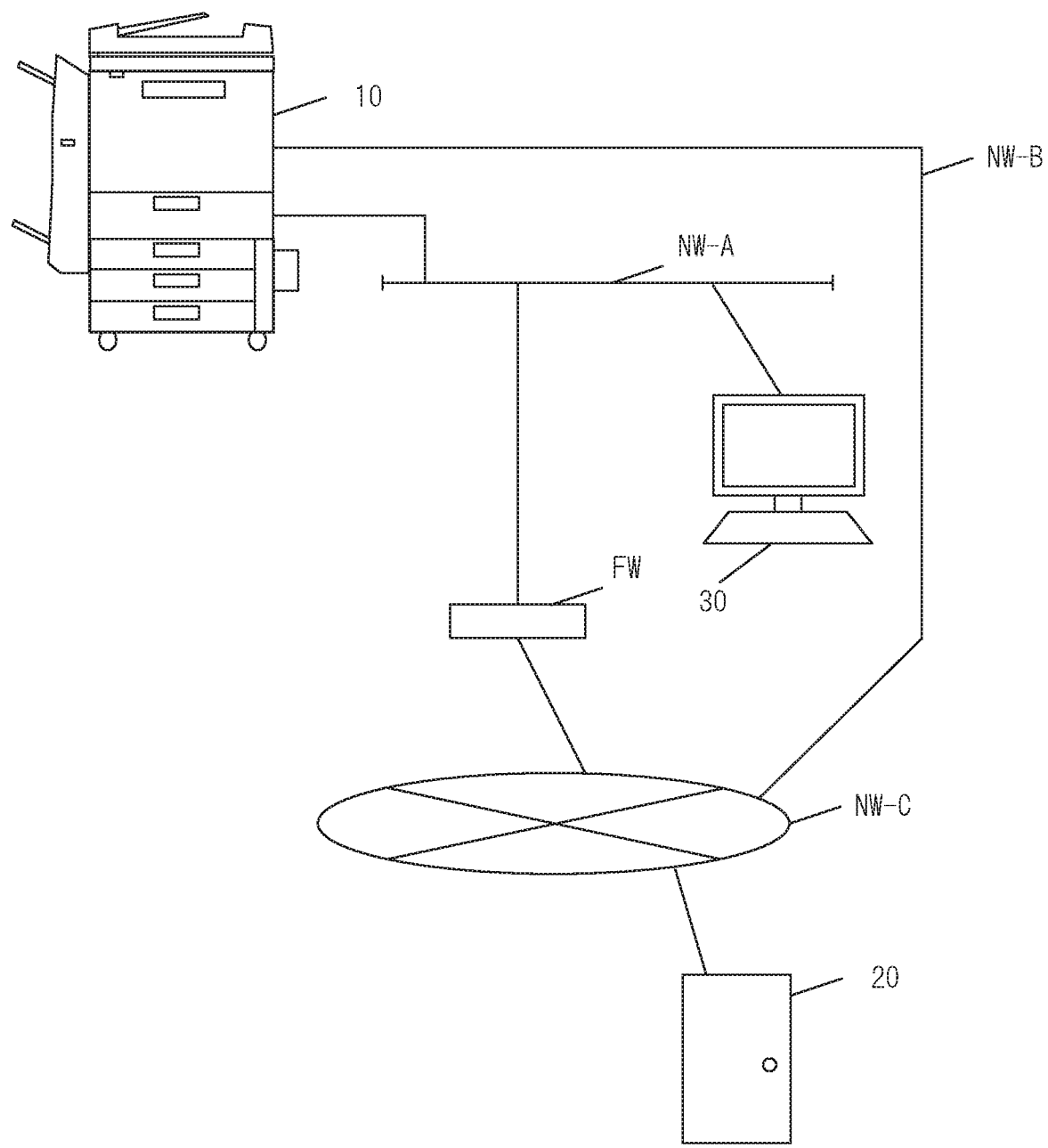
FIG. 1 is a diagram for describing an overall configuration of an image forming apparatus according to a first embodiment.

An overall configuration of a system 1 according to the present embodiment will be described with reference to FIG. 1. As illustrated in FIG. 1, the system 1 includes an image forming apparatus 10 and a management server 20.

The image forming apparatus 10 outputs an image by forming, on a recording sheet or the like, an image from image data input from the outside, and is a so-called multi-function printer. The management server 20 is an information processing apparatus that manages a state of the image forming apparatus 10. The system 1 may include a plurality of image forming apparatuses 10. In this the management server 20 manages states of the plurality of image forming apparatuses 10.

The image forming apparatus 10 is connectable to a network NW-A being a first network of a local area network (LAN) (for example, the Intranet being an intracompany network) and a network NW-B of a public network (for example, a network utilizing the Long Term Evolution (LTE)5G, or the like) serving as a second network different from the first network. The image forming apparatus 10 is further connected to an external network NW-C being a third network such as the Internet, via the network NW-A and the network NW-B. Thus, the image forming apparatus 10 communicates with the management server 20 connected to the network NW-C.

A terminal device 30 may be connected to the network NW-A. The terminal device 30 communicates data and print jobs with the image forming apparatus 10. The network NW-A may be connected to the network NW-C via a firewall FW. The firewall FW sets communication connectable to the network NW-C among types of communication performed by apparatuses connected to the network NW-A.

The management server 20 provides a service related to the image forming apparatus 10. The management server 20 provides the following services, for example.

(1) To perform charging management by acquiring usage information (for example, a counter value) the image forming apparatus 10.

(2) To make a repair request or provide troubleshooting information by acquiring state information (such as a job executed by the image forming apparatus 10, log data indicating the history of the state, and values detected by a sensor) of the image forming apparatus 10.

(3) To order consumable items by acquiring state information (such as a remaining toner amount) of the image forming apparatus 10.

In the present embodiment, the network NW-A is referred to as a "user shared line" and the network NW-B is referred to as a "service dedicated line."

The service dedicated line is a dedicated line for connecting to services provided by the management server 20 described above. The user shared line is a shared line (network) used by ordinary users at a place where the image forming apparatus 10 is installed.

Generally, the user shared line is used by a user at an installation location of the image forming apparatus 10. The image forming apparatus 10 needs to periodically transmit information about the image forming apparatus 10 to the management server 20, and it is not preferable to use the user shared line for the following reasons.

(1) A network load of the user shared line increases. If information of the image forming apparatus 10 originally not related to a user is communicated, a problem arises in that the performance of the entire network deteriorates.

(2) A setting of the firewall FW needs to be changed so that the image forming apparatus 10 communicates with the management server 20. Changing the setting of the firewall FW may adversely affect the security.

(3) Procedures for a separate contract, or the like are required. A communication content of the image forming apparatus 10 is unclear to a user, and thus, procedures may be complicated, for example, the information is disclosed or a separate contract is concluded.

Thus, in the present embodiment, the service dedicated line is normally used to transmit the information (for example, usage information and state information) of the image forming apparatus 10 to the management server 20.

Here, the usage information (first information) is information about a usage of the image forming apparatus 10, such as a usage condition of the image forming apparatus 10. In the present embodiment, the usage information is, for example, a counter value (count data) of the image forming apparatus 10. The count data is information indicating the number (total number) of images formed by an image former 140 described later. The count data may be information indicating the number of formed images for each type of recording sheet on which an image is formed and the number of formed images for each type of color mode (for example, monochrome or color) of the formed image.

The state information (second information) is information other than the usage information about the image forming apparatus 10, and is information acquirable by the image forming apparatus 10 in a current state and/or a past state or until reaching the current state. For example, the state information includes log data indicating an execution history or an operation history of a job of the image forming apparatus 10, a usage condition of each component such as a fixer, defect prediction data predicted from the usage condition, operation information of devices such as a current temperature of a fixing device and an operation state of a fan, a setting value of the image forming apparatus, firm data, and the like.

Defect prediction data refers to data or a report determining that an operation in the image forming apparatus 10 is not a defect but is not normal. An example of the defect prediction data includes the following data.

(1) A Sensor Value Out of a Range of Values Regarded as Normal

A value detected by a sensor device 170 described later and not included in a range of data regarded as normal is treated as defect prediction data. The range that may be regarded as normal is set by an administrator of the image forming apparatus 10 or the like, or is set in advance.

In a specific example, when a conveyance speed of a sheet in a sheet conveyance path is measured by the sensor device 170, the value of the conveyance speed measured by the sensor device 170 is defined as the defect prediction data if the conveyance speed is lower than a range regarded as normal. In this case, a user who confirms a value of the conveyance speed transmitted to the management server 20 knows that a paper jam may occur in the image forming apparatus 10 that has transmitted the value of the conveyance speed.

(2) Log Data Indicating a Potential Problem

Log data indicating that an event equivalent to a machine error occurs, or log data indicating that the processing can be continued although some problem occurs, from among log data, is defined as the defect prediction data. For example, the image forming apparatus 10 stores each log data together along with the importance (log level). At this time, the image forming apparatus 10 treats, as the defect prediction data, the log data stored together along with the importance indicating that the processing can be continued although some problem occurs.

(3) Report Output Based on Sensor Values, Log Data, and the Like

The image forming apparatus 10 uses a learned model that has learned patterns of log data and values detected by the sensor device 170 before occurrence of a machine error to determine whether the current state is a state before occurrence of a machine error, based on the log data and the values detected by the sensor device 170. If it is determined based on the learned model that the current state is a state before occurrence of a machine error, the image forming apparatus 10 uses the information of possibility of occurrence of a machine error, and the recent log data and values detected by the sensor device 170, as the defect prediction data.

In the present embodiment, the usage information being the first information has a smaller data amount than the state information being the second information. That is, a case will be described in which the first formation has a smaller data amount if the first information and the second information are compared. The first information the second information may of course be information other than the above-mentioned information, and may be information treating a machine error, for example. In this case, the first information is an error content such as information indicating a date and time of occurrence of a machine error or a machine error type (an error code or the like), and the second information is a log regarding a machine error (error log data).

1.2 Functional Configuration 1.2.1 Image Forming Apparatus

Figure 2:
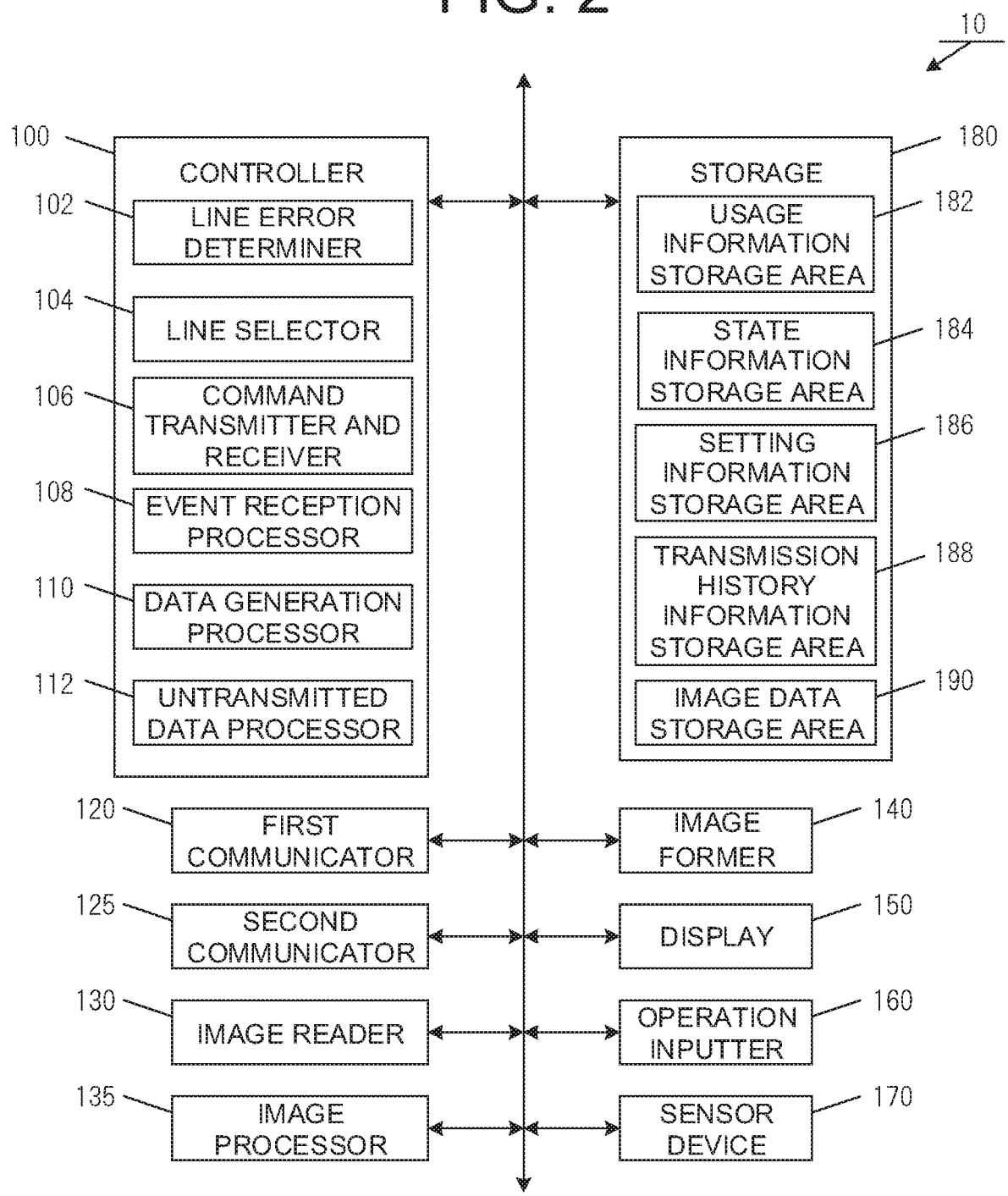
FIG. 2 is a block diagram for describing a functional configuration of the image forming apparatus according to the first embodiment.

A functional configuration of the image forming apparatus 10 in the present embodiment will be described with reference to FIG. 2. As illustrated in FIG. 2, the image forming apparatus 10 includes a controller 100, a first communicator 120, a second communicator 125, an image reader 130, an image processor 135, the image former 140, a display 150, an operation inputter 160, the sensor device 170, and a storage 180.

The controller 100 is a functional element that controls the entire image forming apparatus 10. The controller 100 includes, for example, one or more arithmetic devices (central processing units (CPUs)) and realizes various types of functions by reading and executing various types of programs.

The controller 100 reads and executes a program stored in the storage 180 to realize functions of a line error determiner 102, a line selector 104, a command transmitter and receiver 106, an event reception processor 108, a data generation processor 110, and an untransmitted data processor 112.

The line error determiner 102 determines whether a line state of the service dedicated line is in a normal state where communication is performed or whether the line state is in an abnormal state where communication is not performed. The line error determiner 102 executes a determination process while communication is being performed between the image forming apparatus 10 and the management server 20 through the service dedicated line, for example. An example of a line error determination process realized by the line error determiner 102 will be described with reference to FIG. 3.

The line error determiner 102 performs communication through the service dedicated line (step S102). Specifically, the command transmitter and receiver 106, which will be described later, transmits command data to the management server 20. If "OK" is received as a response from the management server 20, the line error determiner 102 determines that the service dedicated line is normal (communication is appropriately performed) and the first communicator 120 is normal (step S104; Yes→step S116).

In an example of communication performed via a service dedicated line, the image forming apparatus 10 transmits "polling request", "machine error alert", and "request data" to the management server 20. On the other hand, the management server 20 transmits "polling response", "machine error alert response", and "request data response" to the image forming apparatus 10. Hereinafter, the "polling response," the "machine error alert response," and the "request data response" transmitted from the management server 20 to the image forming apparatus 10 are collectively referred to as "response."

The response includes either "OK" as a parameter indicating that the communication is performed normally (in this case, the response indicates a normal state), or "NG" as a parameter indicating that the communication is not performed normally and that some abnormality occurs (in this case, the response is NG).

If NG is received as a response from the management server 20 (step S106; Yes) or if a response is not received due to a timeout (step S106; No→step S108; Yes), the line error determiner 102 adds (increments) 1 to the error value (step S110).

The line error determiner 102 determines whether the error value is equal to or greater than a predetermined determination value (for example, "5") (step S112). If the error value is not equal to or greater than the determination value, the line error determiner 102 again performs communication through the service dedicated line (step S112; No→step S102). That is, the line error determiner 102 transmits a polling request or the like to the management server 20 via the service dedicated line (step S104).

In step S112, if the error value is equal to or larger than the determination value, the line error determiner 102 determines that a line error occurs in the service dedicated line and a failure occurs in the first communicator 120 (step S112; Yes→step S114). As described above, the line error determiner 102 communicates with the management server 20 as many times as the determination value, and if a response including the parameter indicating that the communication is performed normally cannot be received from the management server 20, the line error determiner 102 determines that a line error occurs in the service dedicated line.

It is noted that the line error determiner 102 may determine by another method that a line error occurs in the service dedicated line (communication is not performed). A response utilizing Ping may be checked or network management information may be utilized. For example, the line error determiner 102 may receive a signal indicating that communication is currently possible/impossible from a core network via the first communicator 120.

The line error determiner 102 may execute the line error determination process each time the image forming apparatus 10 performs communication through the service dedicated line, or may execute the line error determination process periodically as an interrupt process.

The line selector 104 selects a line used when the image forming apparatus 10 communicates with the management server 20, from among the service dedicated line or the user shared line. An example of a line selection process realized by the line selector 104 will be described with reference to FIG. 4.

The line selector 104 determines, based on the determination result of the line error determiner 102, whether an error occurs in the service dedicated line(step S132). Here, if a line error occurs in the service dedicated line, the line selector 104 selects the user shared line as a line used for communication between the image forming apparatus 10 and the management server 20 (step S132; Yes→step S134).

On the other hand, if no line errors occur in the service dedicated line, the line selector 104 selects the service dedicated line as the line used for communication between the image forming apparatus 10 and the management server 20 (step S132; No→step S136).

Subsequently, before selecting the service dedicated line, the line selector 104 determines whether the user shared line is selected, and if the user shared line is selected, the line selector 104 transmits a line switching notification to the untransmitted data processor 112 (step S138; Yes→step S140). As a result of such a process, when the service dedicated line is selected in place of the user shared line selected for the line for transmitting and receiving data (when the line is switched), the line selector 104 notifies the untransmitted data processor 112. That is, when it is determined that the failure occurring in the first communicator 120 is resolved, the line selector 104 notifies the untransmitted data processor 112.

The line selector 104 may execute the line selection process after the line error determination process is executed by the line error determiner 102, or each time the command transmitter and receiver 106 transmits a command to the management server 20.

It is noted that after selecting the user shared line as the line used for communication between the image forming apparatus 10 and the management server 20, the line selector 104 may determine whether a line error occurs in the user shared line. Even if determining that a line error occurs in the user shared line, the line selector 104 may select the user shared line, and may cause the command transmitter and receiver 106 to again transmit command data. If determining that a line error occurs in the user shared line, the line selector 104 may notify the command transmitter and receiver 106 that a line error occurs in the user shared line. The command transmitter and receiver 106 receiving the notification may suspend transmission of command data through the user shared line for a predetermined period.

The command transmitter and receiver 106 transmits and receives a command to be exchanged with the management server 20. For example, the command transmitter and receiver 106 analyzes a command received from the management server 20, and transmits necessary data through a line selected by the line selector 104, based on the analyzed command.

Here, the command transmitter and receiver 106 executes a transmission process and a reception process. For example, in the transmission process executed by the command transmitter and receiver 106, transmission data generated by the event reception processor 108, the data generation processor 110, or the untransmitted data processor 112 is transmitted as a command to the management server 20.

In transmitting a command, the command transmitter and receiver 106 transmits a command to the management server 20 through a line selected by the line selector 104. At this time, as will be described later, if the user shared line is selected by the line selector 104, the command transmitter and receiver 106 limits, suppresses, or compresses types of data to be transmitted. In the present embodiment, an example will be described where the command transmitter and receiver 106 limits (selects) types of data to be transmitted if the user shared line is selected by the line selector 104.

FIG. 5 is a flowchart for describing an example of a command transmission process for transmitting request data from among command transmission and reception processes executed by the command transmitter and receiver 106.

If a line error occurs in the service dedicated line, the command transmitter and receiver 106 transmits only the usage information (first information) to the management server 20 (step S142; Yes→step S144). The command transmitter and receiver 106 may determine whether a line error occurs in the service dedicated line, for example, based on a line selected as a line used for communication with the management server 20. That is, if the user shared line is selected as the line used for communication between the image forming apparatus 10 and the management server 20, the command transmitter and receiver 106 determines that a line error occurs in the service dedicated line.

The command transmitter and receiver 106 transmits the state information (second information) being untransmitted data to the untransmitted data processor 112 (step S146). The untransmitted data is data not transmitted to the management server 20 by the image forming apparatus 10 when a line error occurs in the service dedicated line, that is, when a failure occurs in the first communicator 120.

The command transmitter and receiver 106 may transmit, to the untransmitted data processor 112, only the untransmitted data, or the transmitted data that is transmitted to the management server 20 together with the untransmitted data.

If the service dedicated line is normal, the command transmitter and receiver 106 transmits the usage information (first information) and the state information (second information) to the management server 20 (step S142; No→step S148).

Thus, the command transmitter and receiver 106 appropriately selects necessary data according to the line state of the service dedicated line. The command transmitter and receiver 106 transmits the selected data as a command (included in a command) to the management server 20 via a line selected by the line selector 104.

FIG. 6 is a flowchart for describing an example of a command transmission process for transmitting error information from among command transmission processes executed by the command transmitter and receiver 106. The first information is an error content and the second information is error log data.

If a line error occurs in the service dedicated line, the command transmitter and receiver 106 transmits only the error content (first information) to the management server 20 (step S152; Yes step S154). The command transmitter and receiver 106 transmits the error log data (second information) being the untransmitted data to the untransmitted data processor 112 (step S156).

The error log data stored, for example, as a part of the log data stored in a state information storage area 184. In this case, the command transmitter and receiver 106 extracts a log indicating information about a machine error from the log data, and transmits the extracted data to the untransmitted data processor 112. The error log data may be stored in the storage 180 separately from the log data. In this case, the command transmitter and receiver 106 transmits the error log data stored in the storage 180 to the untransmitted data processor 112.

If the service dedicated line is normal no line error occurs), the command transmitter and receiver 106 transmits the error content (first information) and the error log data (second information) to the management server 20 (step S152; No step S158).

In the reception process executed by the command transmitter and receiver 106, a command transmitted from the management server 20 is received, for example. The command transmitter and receiver 106 analyzes the command and extracts a parameter and data included in the command. The command transmitter and receiver 106 also notifies the event reception processor 108 and/or the data generation processor 110, as necessary. For example, the command transmitter and receiver 106 notifies the event reception processor 108 of an event of acquiring a setting value in the image forming apparatus 10, an event of rewriting data in the image forming apparatus 10, an event of acquiring a log in the image forming apparatus 10, and the like.

If an interruption occurs in the image forming apparatus 10, the event reception processor 108 receives the interruption as an event. For example, if a machine error (for example, a paper jam, a waste toner bottle replacement, or an empty toner) occurs in the image forming apparatus 10, a notification is transmitted, as an event, to each of the functional elements such as the controller 100. The event reception processor 108 notifies a functional element that processes various types of events, based on the notification received from the command transmitter and receiver 106. For example, the event reception processor 108 notifies a functional element that performs a process of acquiring a setting value in the image forming apparatus 10 of an event of acquiring a setting value in the image forming apparatus 10. Thus, the event reception processor 108 generates an event, based on the command received from the server, to cause the functional element to execute a necessary process. An execution result of the event (such as the setting value in the image forming apparatus 10) is stored in the storage 180 through processes by each of the functional elements.

The data generation processor 110 collects requested data, based on the notification from the command transmitter and receiver 106, to generate a command to be transmitted to the management server 20. The data generation processor 110 may also collect data related to the event received by the event reception processor 108, or may generate a command to be transmitted to the management server 20, based on the untransmitted data transmitted from the untransmitted data processor 112.

Here, examples of the command data generated by the data generation processor 110 include the following.

(1) Polling request
(2) Machine error alert
(3) Request data

The polling request is a command for the line error determiner 102 to determine whether a line through which the image forming apparatus 10 and the management server 20 communicate is normal. The polling request may be appropriately transmitted from the image forming apparatus 10 to the management server 20 before the communication between the image forming apparatus 10 and the management server 20, or may be periodically transmitted (for example, every one second, every five seconds, every one minute, or every 30 minutes). In receiving a polling response including a parameter "OK" from the management server 20, the line error determiner 102 determines that a communication line is normal.

The machine error alert is a data command transmitted to the management server 20 if a machine error occurs in the image forming apparatus 10. The machine error alert includes, as a parameter, one or more pieces of information including a date and time of occurrence of the machine error, a machine error type, and error log data. If the communication line is abnormal, the machine error alert may also include, as a parameter, a fact that a line error occurs in the communication line.

The request data is data transmitted if a data acquisition request is issued from the management server 20. The request data includes the usage information and/or the state information as data. The image forming apparatus 10 receives a polling response from the management server 20. If the polling response includes an acquisition request, the data generation processor 110 generates data based on the acquisition request. The image forming apparatus 10 transmits the request data to the management server 20.

If receiving untransmitted data related to the request data from the untransmitted data processor 112, the data generation processor 110 generates request data including the untransmitted data. If receiving untransmitted data related to a machine error from the untransmitted data processor 112, the data generation processor 110 generates a machine error alert including the untransmitted data.

If receiving the untransmitted data from the command transmitter and receiver 106, or receiving a line switching notification from the line selector 104, the untransmitted data processor 112 performs a predetermined process.

If receiving the untransmitted data from the command transmitter and receiver 106, the untransmitted data processor 112 stores transmission history information including the received untransmitted data in a transmission history information storage area 188. If receiving the untransmitted data and the transmitted data from the command transmitter and receiver 106, the untransmitted data processor 112 may group the two data pieces to store the resultant data as transmission history information.

Further, the untransmitted data processor 112 performs a process of transmitting untransmitted data to the management server 20, based on the notification from the line selector 104. FIG. 7 is a flowchart for describing an example of an untransmitted data transmission process executed when untransmitted data is transmitted to the management server 20, from among the processes executed by the untransmitted data processor 112.

First, the untransmitted data processor 112 determines whether a switching notification is received from the line selector 104 (step S172).

If a line switching notification is received, that is, if the failure occurring in the first communicator 120 is resolved, the untransmitted data processor 112 determines whether untransmitted data is present (step S174). Whether untransmitted data is present, it is determined that untransmitted data is present when transmission history information including untransmitted data is stored in the transmission history information storage area 188.

If untransmitted data is present, the untransmitted data processor 112 reads the untransmitted data stored in the transmission history information storage area 188 and transmits the read data to the data generation processor 110 (step S176). Thus, request data or a machine error alert based on the untransmitted data is generated and transmitted to the management server 20 by the data generation processor 110, and the untransmitted data is transmitted to the management server 20.

The untransmitted data processor 112 prevents untransmitted data from being transmitted to the management server 20 again after transmitting the untransmitted data to the management server 20. For example, the untransmitted data processor 112 deletes the transmission history information including the untransmitted data transmitted to the management server 20, from the transmission history information storage area 188. The untransmitted data processor 112 may store information indicating that the untransmitted data has been transmitted, into the transmission history information including the untransmitted data transmitted to the management server 20.)

The first communicator 120 connects to the service dedicated line (network NW-B) and communicates with the management server 20. For example, the first communicator 120 includes a communication module connectable to Long Term Evolution (LTE)/LTE-Advanced (LTE-A)/a License-Assisted Access (LAA) using LTE/a 5G line.

The second communicator 125 connects to the user shared line (network NW-A) and communicates with other devices. For example, the second communicator 125 includes a wired/wireless LAN communication module connectable to Ethernet (registered trademark).

The image reader 130 is a functional element that reads an image of a document and generates image data. For example, the image reader 130 includes a scanner device provided with a device that converts optical information of a charge coupled device (CCD), a contact image sensor (CIS) or the like into an electric signal.

The image processor 135 is a functional element that performs various types of image processes and image quality adjustment on image data. For example, the image processor 135 performs a sharpening process or a color conversion process on image data.

The image former 140 is a functional element that forms image data on a recording medium (for example, a recording sheet). The image former 140 includes, for example, a laser printer or the like utilizing an electrophotographic method.

The display 150 is a functional element that displays various types of information to a user and includes, for example, a liquid crystal display (LCD) and an organic electro luminescence (EL) display. The operation inputter 160 is a functional element that receives an operation instruction from a user, and includes various types of key switches, and a hardware key that detects a touch input or the like. The image forming apparatus 10 may include a touch panel in which the display 150 and the operation inputter 160 are integrally formed. If the touch panel is employed, the operation inputter 160 may be realized by a software key, for example. A method of detecting an input on the touch panel may be a common detection method such as resistive type, infrared type, electromagnetic induction type, or a capacitive type.

The sensor device 170 is a functional element that detects an operation state inside the image forming apparatus 10, and includes various types of sensors. For example, the sensor device 170 includes a speed sensor that detects a speed at which a recording sheet on which an image is formed is moved inside the image forming apparatus 10 when the controller 100 executes a print or copy job, and includes a temperature sensor that detects a temperature or the like inside the image forming apparatus 10.

The storage 180 is a functional element that stores various types of programs and various types of data necessary for an operation of the image forming apparatus 10. The storage 180 includes, for example, a solid state drive (SSD) being a semiconductor memory, and a hard disk drive (HDD).

In the present embodiment, the storage 180 secures a usage information storage area 182, the state information storage area 184, a setting information storage area 186, the transmission history information storage area 188, and an image data storage area 190.

The usage information storage area 182 stores usage information in the image forming apparatus 10. The state information storage area 184 stores state information in the image forming apparatus 10.

The setting information storage area 186 stores information set in the image forming apparatus 10. For example, information indicating a connection destination of the management server 20 (for example, an IP address) and information such as a timing for performing a polling operation on the management server 20 are stored as setting information related to communication with the server.

The transmission history information storage area 188 stores the transmission history information stored by the untransmitted data processor 112. In the transmission history information storage area 188, as shown in FIG. 8, for example, a transmission date and time (for example, "2019/04/01 11:01:22"), command data (for example, "Request data"), an information type (for example, "Usage information"), transmission data (for example, [Count data] 82 sheets), and a transmission result (for example, "Transmitted") are stored as transmission history information.

The transmission date and time is a date and time when the command transmitter and receiver 106 transmits command data to the management server 20, and, for example, a time when the command transmitter and receiver 106 starts communicating 1 the management server 20 is stored. In the command data, a type of command data generated by the data generation processor 110 is stored. The transmission data is data transmitted to the management server 20. The transmission result is information indicating whether or not the transmission data is transmitted to the management server 20, and if the transmission result is "transmitted", the transmission result indicates that the transmission data is transmitted to the management server 20. On the other hand, if the transmission result is "untransmitted", the transmission result indicates that the transmission data is not transmitted to the management server 20. That is, the transmission data with the transmission result "untransmitted" is untransmitted data.

If transmitted data is received, in addition to the untransmitted data, from the command transmitter and receiver 106, the untransmitted data processor 112 may store transmission history information in which the untransmitted data and the transmitted data are grouped, in the transmission history information storage area 188. For example, as D1000 of FIG. 8, the untransmitted data processor 112 may store transmission history information including error log data not transmitted and an error content transmitted when the command transmitter and receiver 106 transmits a machine error alert to the management server 20 at 16:41:22 on Apr. 1, 2019.

If receiving only untransmitted data from the command transmitter and receiver 106, the untransmitted data processor 112 may store transmission history information in which the received untransmitted data is the transmission data, and the transmission result is "untransmitted", in the transmission history information storage area 188.

1.2.2 Management Server

Figure 9:
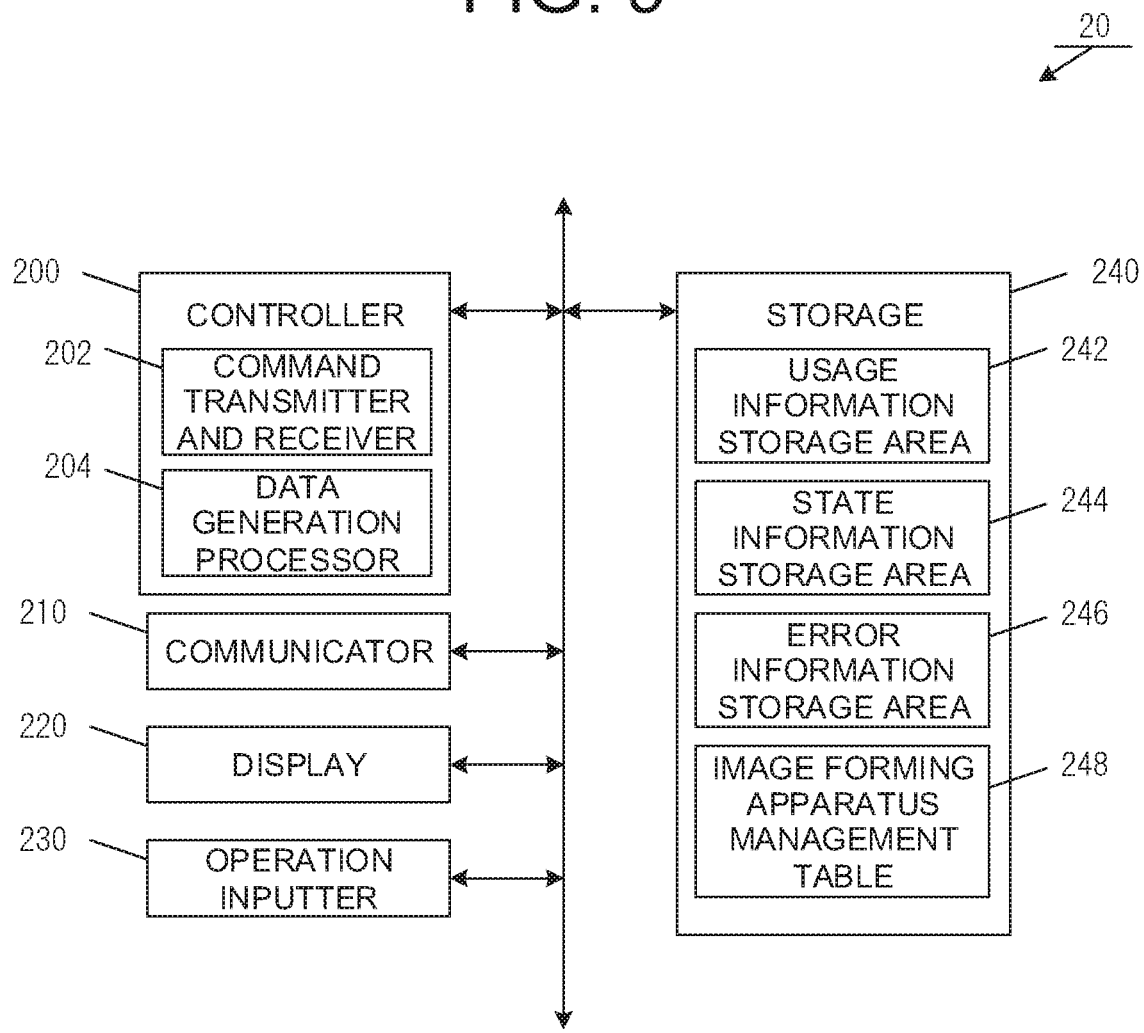
FIG. 9 is a block diagram for describing a functional configuration of a management server according to the first embodiment.

A functional configuration of the management server 20 in the present embodiment will be described with reference to FIG. 9. As illustrated in FIG. 9, the management server 20 includes a controller 200, a communicator 210, a display 220, an operation inputter 230, and a storage 240.

The controller 200 is a functional element that controls the entire management server 20. The controller 200 realizes various types of functions by reading and executing various types of programs, and includes, for example, one or more arithmetic devices (CPUs).

The controller 200 realizes functions of a command transmitter and receiver 202 and a data generation processor 204 by reading and executing a program stored in the storage 240.

The command transmitter and receiver 202 transmits and receives a command to be exchanged with the image forming apparatus 10. For example, the command transmitter and receiver 202 analyzes a command received from the image forming apparatus 10 and transmits a response including a parameter to the image forming apparatus 10.

Here, the command transmitter and receiver 202 executes a transmission process and a reception process. In the transmission process executed by the command transmitter and receiver 202, transmission data generated by the data generation processor 204 is transmitted as a command to the management server 20, for example.

In the reception process executed by the command transmitter and receiver 202, a command transmitted from the image forming apparatus 10 is received, for example. The command transmitter and receiver 202 analyzes the command and extracts a parameter and data included in the command. The command transmitter and receiver 202 notifies the data generation processor 204, as necessary.

Here, examples of the command data generated by the data generation processor 204 include the following.

(1) Polling response
(2) Machine error alert response
(3) Request data response

The polling response is a command for responding to a polling request received from the image forming apparatus 10. The data generation processor 204 may include, in the polling response, a parameter "OK" indicating that a communication state is normal or a parameter "NG" indicating that the communication state is abnormal. A parameter "acquisition request" for requesting data of the image forming apparatus 10 may also be included in the polling response.

The machine error alert response is a command for responding to a machine error alert received from the image forming apparatus 10. If an error content of the alert is normally received from the image forming apparatus 10, the management server 20 transmits the machine error alert response to the image forming apparatus 10. At this time, if the error content is normally received, the data generation processor 204 may include a parameter "OK" in a parameter of the machine error alert response.

The request data response is a command for responding to request data if the request data received from the image forming apparatus 10 is normally received. The data generation processor 204 may include a parameter "OK" in the request data response.

The communicator 210 is a functional element for the management server 20 to communicate with an external device. For example, the communicator 210 is configured as an interface communicatable via a wireless LAN or a wired LAN.

The display 220 displays various types of information. For example, the display 220 includes a device such as an LCD or an organic EL display. The operation inputter 230 is a functional element that receives an operation input from a user, and includes, for example, an external input device such as a keyboard and a mouse.

The storage 240 is a functional element that stores various types of programs and various types of data necessary for an operation of the management server 20. The storage 240 includes, for example, an SSD being a semiconductor memory, and an HDD.

The storage 240 secures storage areas including a usage information storage area 242, a state information storage area 244, and an error information storage area 246, and stores an image forming apparatus management table 248.

The usage information storage area 242 stores usage information acquired from the image forming apparatus 10. The state information storage area 244 stores state information acquired from the image forming apparatus 10. The storage 240 may store the usage information and the state information for each image forming apparatus 10 from which the information is received. It is noted that the usage information and device information have substantially the same data configuration as the usage information and the device information stored in the image forming apparatus 10.

The error information storage area 246 stores information (error information) about a machine error acquired from the image forming apparatus 10. The error information in the present embodiment includes an apparatus ID (for example, "1") for identifying the image forming apparatus 10, a date and time of occurrence of the machine error (for example, "2019/04/01 11:01:22"), a machine error type (for example, "paper jam"), and error log data (for example, "ERROR 2019-04-01 11:01:22 paper jam, tray1").

The image forming apparatus management table 248 manages the image forming apparatus 10 managed by the management server 20. For example, the image forming apparatus management table 248 stores an IP address of the image forming apparatus 10, a timing of information acquisition from the image forming apparatus 10, and the like, and the controller 200 refers to the image forming apparatus management table 248 to manage the image forming apparatus 10.

1.2.3 Terminal Device

The terminal device 30 is an information processing apparatus, such as a computer, a smartphone, or a tablet, connectable to the network NW-A. The terminal device 30 includes at least a controller, a storage, and a communicator. The terminal device 30 may also include a display, an operation processor, and the like, as necessary.

The terminal device 30 transmits a print job to the image forming apparatus 10 via the network NW-A. The image forming apparatus 10 stores the print job received via the second communicator 125 in the storage 180. The image forming apparatus 10 reads a print job as appropriate, executes image processing in the image processor 135, and then forms an image on, for example, recording paper by the image former 140.

1.3 Process Flow

In the present embodiment, a content communicated with the management server 20 by the image forming apparatus 10 through the service dedicated line and the user shared line will be described with reference to the drawings. FIGS. 11 through 14 are sequence charts illustrating a content communicated with the management server 20 by the image forming apparatus 10 through the service dedicated line and the user shared line.

1.3.1 Process in Normal State

Figure 11:
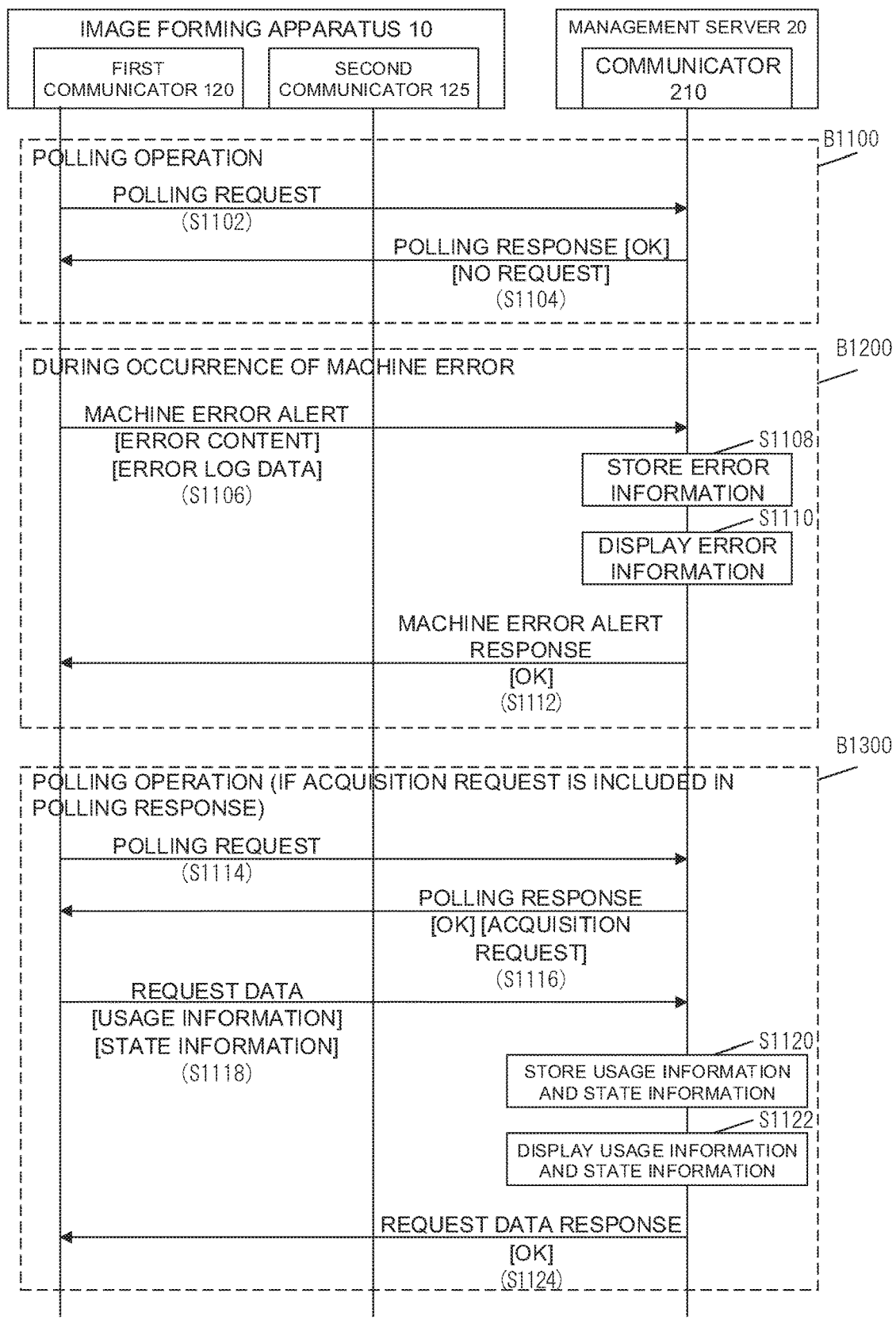
FIG. 11 is a sequence chart illustrating an operation example according to the first embodiment.

First, a process flow in a normal state being a state in which no line error occurs in the service dedicated line will be described with reference to FIG. 11.

First, a polling operation (B1100) in which the image forming apparatus 10 polls the management server 20 will be described.

Specifically, the command transmitter and receiver 106 of the image forming apparatus 10 transmits a polling request generated by the data generation processor 110 to the management server 20 via the first communicator 120 (S1102). The command transmitter and receiver 202 of the management server 20 analyzes the received polling request and notifies the data generation processor 204. The data generation processor 204 receiving the notification generates command of a polling response. The command transmitter and receiver 202 transmits the polling response generated by the data generation processor 204 to the image forming apparatus 10 via the communicator 210 (S1104).

The polling request is normally received through the service dedicated line, and thus, the data generation processor 204 may generate a command of a polling response with including "OK" as a parameter. At this point, there is no data to be requested from the image forming apparatus 10, and thus, the management server 20 may include only "OK" or may include a parameter indicating "no request", as a parameter included in the polling response.

As described above, the polling request and the polling response are transmitted between the image forming apparatus 10 and the management server 20 via the service dedicated line.

Next, an operation when a machine error occurs in the image forming apparatus 10 will be described (B1200).

If a machine error occurs in the image forming apparatus 10, the event reception processor 108 detects the machine error and notifies each of the functional elements. Based on the notification from the event reception processor 108, the data generation processor 110 collects data such as an error content (a date and time of occurrence of the machine error and a machine error type) and error log data, as information about the machine error. The data generation processor 110 generates a command of a machine error alert including the collected data.

The command transmitter and receiver 106 transmits a machine error alert to the management server 20 via the first communicator 120 (S1106).

The command transmitter and receiver 202 of the management server 20 receives the machine error alert from the image forming apparatus 10 via the communicator 210. The command transmitter and receiver 202 of the management server 20 analyzes a content of the command. Based on the analysis result of the command transmitter and receiver 202, the controller 200 stores, as error information, the error content and the error log data in the error information storage area 246, and displays the error information (for example, the machine error type) on the display 220 (S1108→S1110).

In the management server 20, the data generation processor 204 generates a command of a machine error alert response. The command transmitter and receiver 202 transmits the machine error alert response generated by the data generation processor 204 to the image forming apparatus 10 (S1112). The data generation processor 204 may include "OK" indicating that a process is normally performed, in a parameter of the machine error alert response.

As described above, if a machine error occurs, the machine error alert and the machine error alert response are transmitted and received through communication between the image forming apparatus 10 and the management server 20 via the service dedicated line.

Next, an opera on (B130 in a case where the management server 20 includes an acquisition request in a parameter of the polling response will be described.

Specifically, the command transmitter and receiver 106 of the image forming apparatus 10 transmits the polling request generated by the data generation processor 110 to the management server 20 via the first communicator 120 (S1114). The command transmitter and receiver 202 of the management server 20 analyzes the received polling request and notifies the data generation processor 204.

The data generation processor 204 receiving the notification generates a command of a polling response. At this time, the data generation processor 204 includes an "acquisition request" as a parameter in the polling response. The command transmitter and receiver 202 transmits the polling response generated by the data generation processor 204 to the image forming apparatus 10 via the communicator 210 (S1116).

If the command transmitter and receiver 106 of the image forming apparatus 10 analyzes the polling response and determines that the "acquisition request" is included as a parameter, the command transmitter and receiver 106 notifies the data generation processor 110 of reception of the acquisition request from the management server 20. The data generation processor 110 reads information from the usage information storage area 182 and the state information storage area 184, and generates request data including the usage information and the state information. The command transmitter and receiver 106 transmits the generated request data via the first communicator 120 (S1118).

The command transmitter and receiver 202 analyzes the request data received from the image forming apparatus 10 and extracts the usage information and the state information. The controller 200 stores the extracted usage information in the usage information storage area 242 and stores the extracted state information in the state information storage area 244 (S1120). The controller 200 displays the usage information and the state information included in the request data (S1122).

The command transmitter and receiver 202 notifies the data generation processor 204 of reception of the request data. The data generation processor 204 receiving the notification generates a command of a request data response. The command transmitter and receiver 202 transmits the request data response generated by the data generation processor 204 to the image forming apparatus 10 via the communicator 210 (S1124).

As described above, the request data and the request data response are transmitted and received through communication between the image forming apparatus 10 and the management server 20 via the service dedicated line.

1.3.2 Case where Polling Operation Cannot be Performed Normally Due to Line Error Next, an operation in a case where a line error occurs in the service dedicated line, and a polling operation cannot be performed normally will be described with reference to FIG. 12.

First, the data generation processor 110 of the image forming apparatus 10 generates a command of a polling request. The command transmitter and receiver 106 transmits the polling request to the management server 20 via the first communicator 120 (S1202).

Here, if a reception of a response from the management server 20 times out or a polling response including information "NG" is acquired, the command transmitter and receiver 106 transmits the polling request again via the first communicator 120 (S1204).

That is, in step S1202, a polling response indicating that the communication is normally executed is not received from the management server 20, and thus, the line error determiner 102 determines whether the service dedicated line is currently normal or a line error occurs. Thus, the command transmitter and receiver 106 repeatedly transmits the polling request until the number of times of polling request transmissions reaches equal to or greater than a determination value.

If a polling response indicating that the communication is normally executed is not received from the management server 20 even when polling request transmissions are performed at least the number of times equal to or larger than the determination value, the line error determiner 102 determines that a line error occurs in the service dedicated line. The line selector 104 switches a communicator that communicates with the management server 20 from the first communicator 120 to the second communicator 125. That is, the user shared line is selected in place of the service dedicated line as a communication line for communication between the image forming apparatus 10 and the management server 20 (S1206 in FIG. 12/step S132 in FIG. 4; Yes→step S134).

It is noted that the command transmitter and receiver 106 of the image forming apparatus 10 periodically transmits the polling request to the management server 20 via the first communicator 120 (for example, S1218). This is because the line error determiner 102 determines whether the line error occurring in the service dedicated line is resolved.

In receiving a notification of a failure occurring in the first communicator 120, the event reception processor 108 notifies each of the functional elements of the failure. Based on the notification from the event reception processor 108, the data generation processor 110 receiving the notification collects information about the machine error and generates a command of a machine error alert.

The command transmitter and receiver 106 transmits the machine error alert to the management server 20. However, in S1206, the communicator that communicates with the management server 20 is switched to the second communicator 125, and thus, the command transmitter and receiver 106 selects data to be transmitted to the management server 20. Specifically, the command transmitter and receiver 106 limits data to be included in the machine error alert to the error content, and then transmits the machine error alert to the management server 20. Thus, for example, the error content is transmitted to the management server 20, but the error log data is not transmitted (S1208).

The command transmitter and receiver 106 transmits error log data being the untransmitted data to the untransmitted data processor 112. The untransmitted data processor 112 stores the transmission history information including the error log data received from the command transmitter and receiver 106 (S1210).

The command transmitter and receiver 202 of the management server 20 analyzes the received machine error alert and notifies the data generation processor 204. The data generation processor 204 receiving the notification generates a command of a machine error alert response. The command transmitter and receiver 202 transmits the generated command of the machine error alert response to the image forming apparatus 10 (S1212). The controller 200 stores and displays the error content received from the image forming apparatus 10.

The command transmitter and receiver 106 of the image forming apparatus 10 transmits a polling request (S1214) and receives a polling response (S1216) via the second communicator 125.

If transmitting a polling request S122 and receiving a polling response including a parameter of an acquisition request from the management server 20 (S1222), the command transmitter and receiver 106 transmits request data via the second communicator 125 (S1224). In this case, the communicator that communicates with the management server 20 is switched to the second communicator 125, and thus, the command transmitter and receiver 106 selects data to be transmitted to the management server 20 and limits data to be transmitted. For example, the command transmitter and receiver 106 of the image forming apparatus 10 selects the usage information for data to be included in the request data, and then transmits the request data to the management server 20. As a result, the state information is not transmitted to the management server 20.

The command transmitter and receiver 106 transmits the state information being the untransmitted data to the untransmitted data processor 112. The untransmitted data processor 112 stores the transmission history information including the state information received from the command transmitter and receiver 106 (S1226).

The command transmitter and receiver 202 of the management server 20 analyzes the received request data and notifies the data generation processor 204. The data generation processor 204 receiving the notification generates a command of a request data response. The command transmitter and receiver 202 transmits the generated command of the request data response to the image forming apparatus 10 (S1228). The controller 200 stores and displays the usage information received from the image forming apparatus 10.

Figure 12:
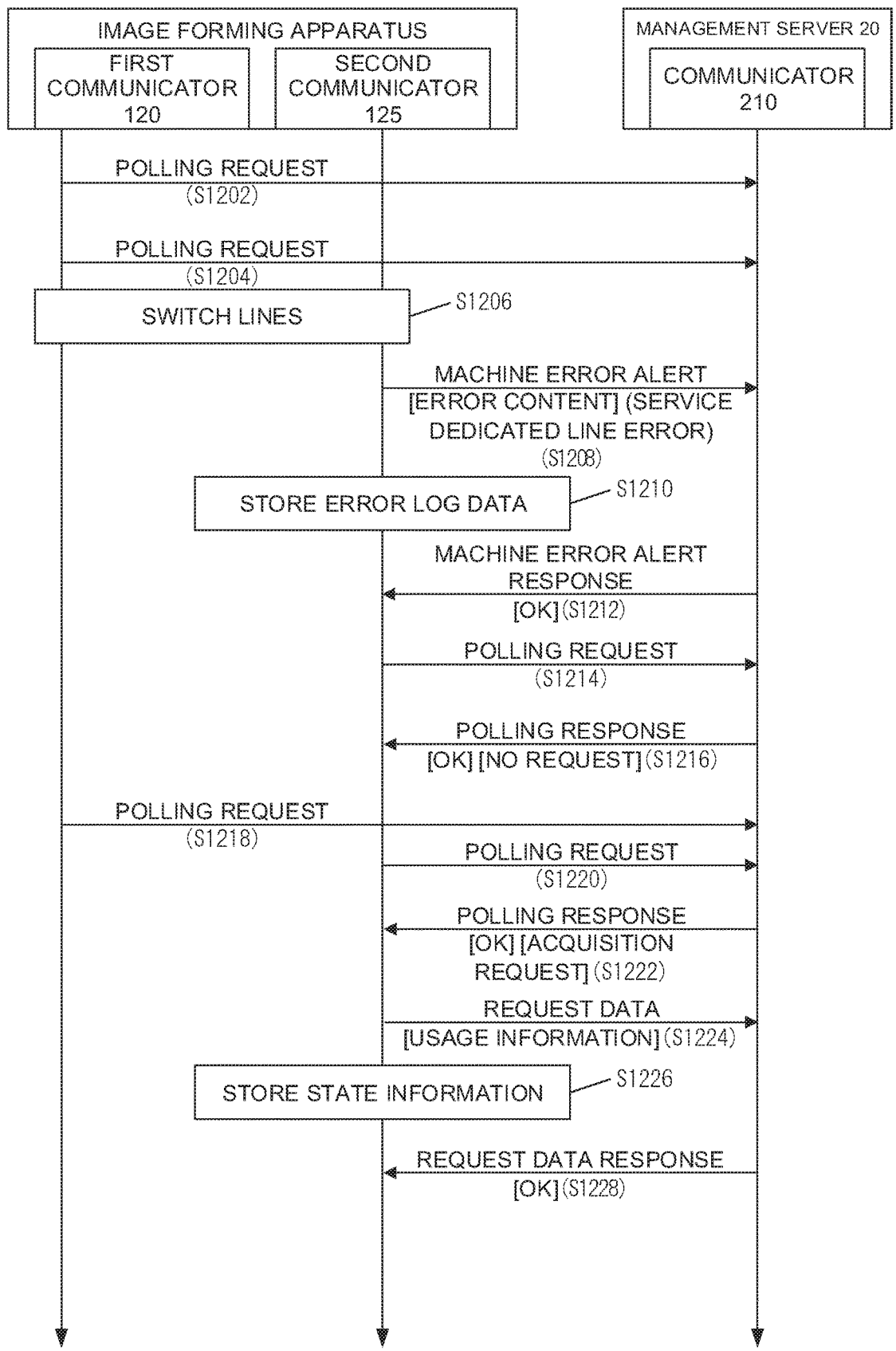
FIG. 12 is a sequence chart illustrating an operation example according to the first embodiment.

Thus, as illustrated in the sequence in FIG. 12, when transmitting data to the management server 20 via the second communicator 125, the image forming apparatus 10 transmits either one of the first information or the second information. The image forming apparatus 10 also stores other information not transmitted to the management server 20.

1.3.3 Case where Machine Error Alert Cannot be Transmitted Due to Line Error

Next, with reference to FIG. 13, an operation in a case where a line error occurs in the service dedicated line and a machine error alert cannot be transmitted normally will be described.

First, the command transmitter and receiver 106 transmits a polling request to the management server 20 via the first communicator 120 (S1302). The command transmitter and receiver 106 receives a polling response transmitted from the management server 20 via the first communicator 120 (S1304).

If a machine error occurs in the image forming apparatus 10, the command transmitter and receiver 106 transmits a machine error alert including the error content and the error log data to the management server 20 via the first communicator 120 (S1306). At this time, if the machine error alert is not normally transmitted, the command transmitter and receiver 106 repeatedly transmits the machine error alert (S1308).

If the machine error alert is not transmitted normally even when the machine error alert is transmitted as many times as a predetermined determination value, the command transmitter and receiver 106 switches the communicator that communicates with the management server 20 from the first communicator 120 to the second communicator 125 (S1310).

The command transmitter and receiver 106 transmits the machine error alert including the error content not transmitted in S1306 to the management server 20 via the second communicator 125 (S1312). The command transmitter and receiver 106 also transmits the error log data not transmitted to the management server 20 to the untransmitted data processor 112. The untransmitted data processor 112 stores the transmission history information including the error log data received from the command transmitter and receiver 106 (S1314).

In receiving a machine error alert response from the management server 20 (S1316), the command transmitter and receiver 106 transmits, to the management server 20, a machine error alert in which the error content indicates a service dedicated line error (S1318). The command transmitter and receiver 106 also transmits the error log data not transmitted to the management server 20 to the untransmitted data processor 112. The untransmitted data processor 112 stores the transmission history information including the error log data received from the command transmitter and receiver 106 (S1320). The command transmitter and receiver 106 again receives a machine error alert response from the management server 20 via the second communicator 125 (S1322).

Figure 13:
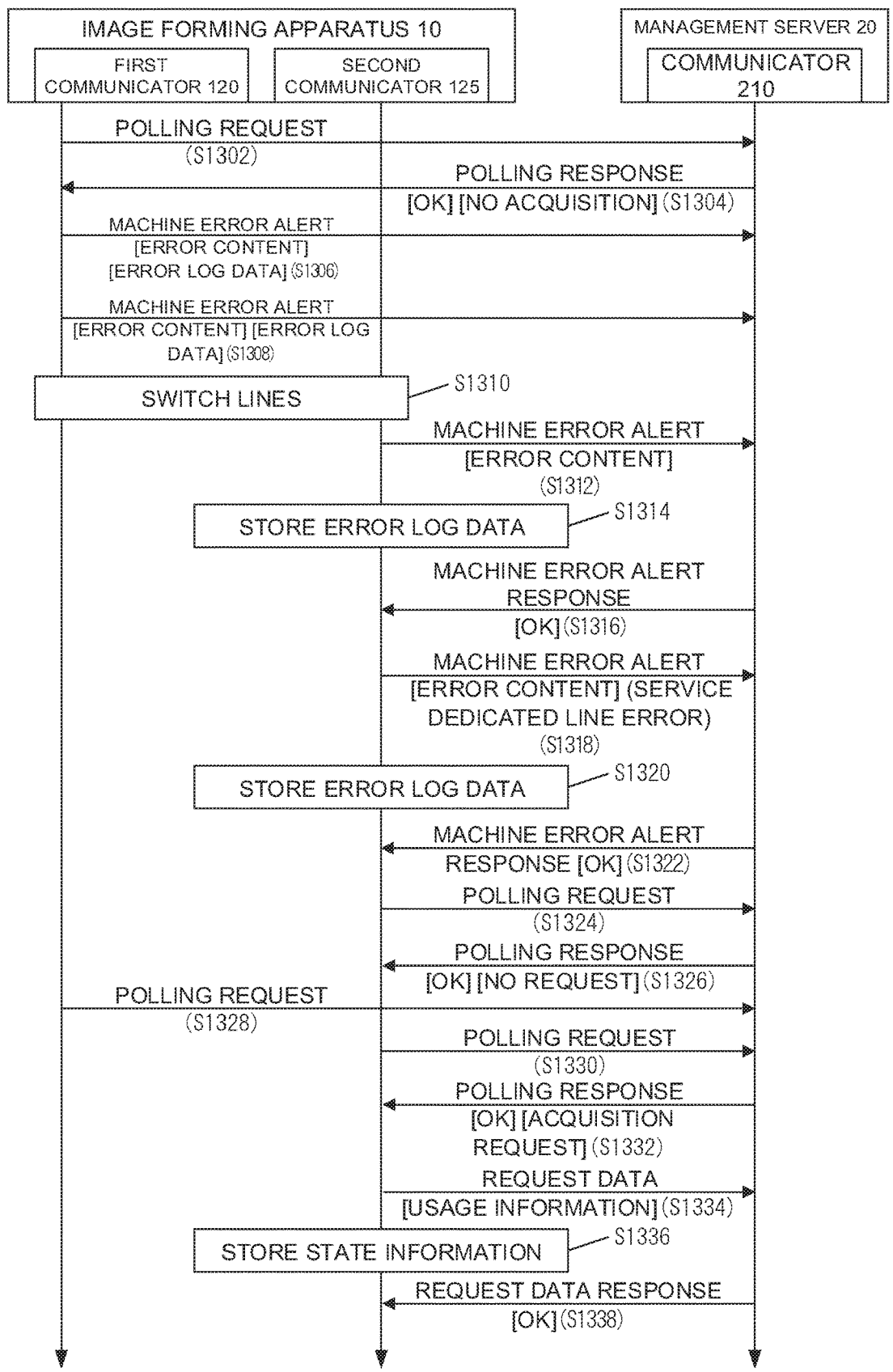
FIG. 13 is a sequence chart illustrating an operation example according to the first embodiment.

The subsequent processing is similar to S1314 in FIG. 13. That is, after switching the communicator that communicates with the management server 20 to the second communicator 125, the image forming apparatus 10 communicates with the management server 20 via the second communicator 125. For example, the command transmitter and receiver 106 of the image forming apparatus 10 periodically transmits a polling request to the management server 20 via the second communicator 125 (S1324). The command transmitter and receiver 106 of the image forming apparatus 10 receives the machine error alert response from the management server 20 via the second communicator 125 (S1326).

The command transmitter and receiver 106 of the image forming apparatus 10 periodically transmits a polling request to the management server 20 via the first communicator 120 (S1328).

The image forming apparatus 10 transmits a polling request to the management server 20 via the second communicator 125 (S1330). If a polling response including a parameter of an acquisition request is received from the management server 20 (S1332), the command transmitter and receiver 106 transmits request data including usage information (S1334). The command transmitter and receiver 106 transmits the state information being the untransmitted data to the untransmitted data processor 112. The untransmitted data processor 112 stores the transmission history information including the state information received from the command transmitter and receiver 106 (S1336). The image forming apparatus 10 receives the request data response from the management server 20 (S1338).

1.3.4 Case where Line Error Occurring in Service Dedicated Line is Resolved

Next, an operation in a case where a line error occurs in the service dedicated line will be described with reference to FIG. 14. In the description of the operation, it is assumed that a line error currently occurs in the service dedicated line.

Even if a line error occurs in the service dedicated line, the command transmitter and receiver 106 of the image forming apparatus 10 periodically transmits a polling request to the management server 20 via the first communicator 120 (S1402). The command transmitter and receiver 106 transmits a polling request to the management server 20 via the second communicator 125 because a line error occurs in the service dedicated line. The command transmitter and receiver 106 receives a polling response from the management server 20 via the second communicator 125 (S1406).

Here, when the line error determiner 102 transmits a polling request via the first communicator 120 (S1406), the command transmitter and receiver 106 may receive a polling response from the management server 20 (S1408). In such a case, the line selector 104 switches the communicator that communicates with the management server 20 from the second communicator 125 to the first communicator 120. That is, the user shared line is selected in place of the service dedicated line as a communication line for communication between the image forming apparatus 10 and the management server 20 (S1412 in FIG. 14/step S132 in FIG. 4; No step S136).

Triggered by the fact that the service dedicated line is selected in place of the user shared line selected until then for the line used for communicating with the management server 20, the line selector 104 transmits a line switching notification to the untransmitted data processor 112.

The untransmitted data processor 112 receiving the line switching notification transmits the untransmitted data to the management server 20. For example, if the untransmitted data includes error log data, the untransmitted data processor 112 transmits the error log data to the data generation processor 110. At this time, the untransmitted data processor 112 may also transmit the transmitted error content to the data generation processor 110.

Figure 14:
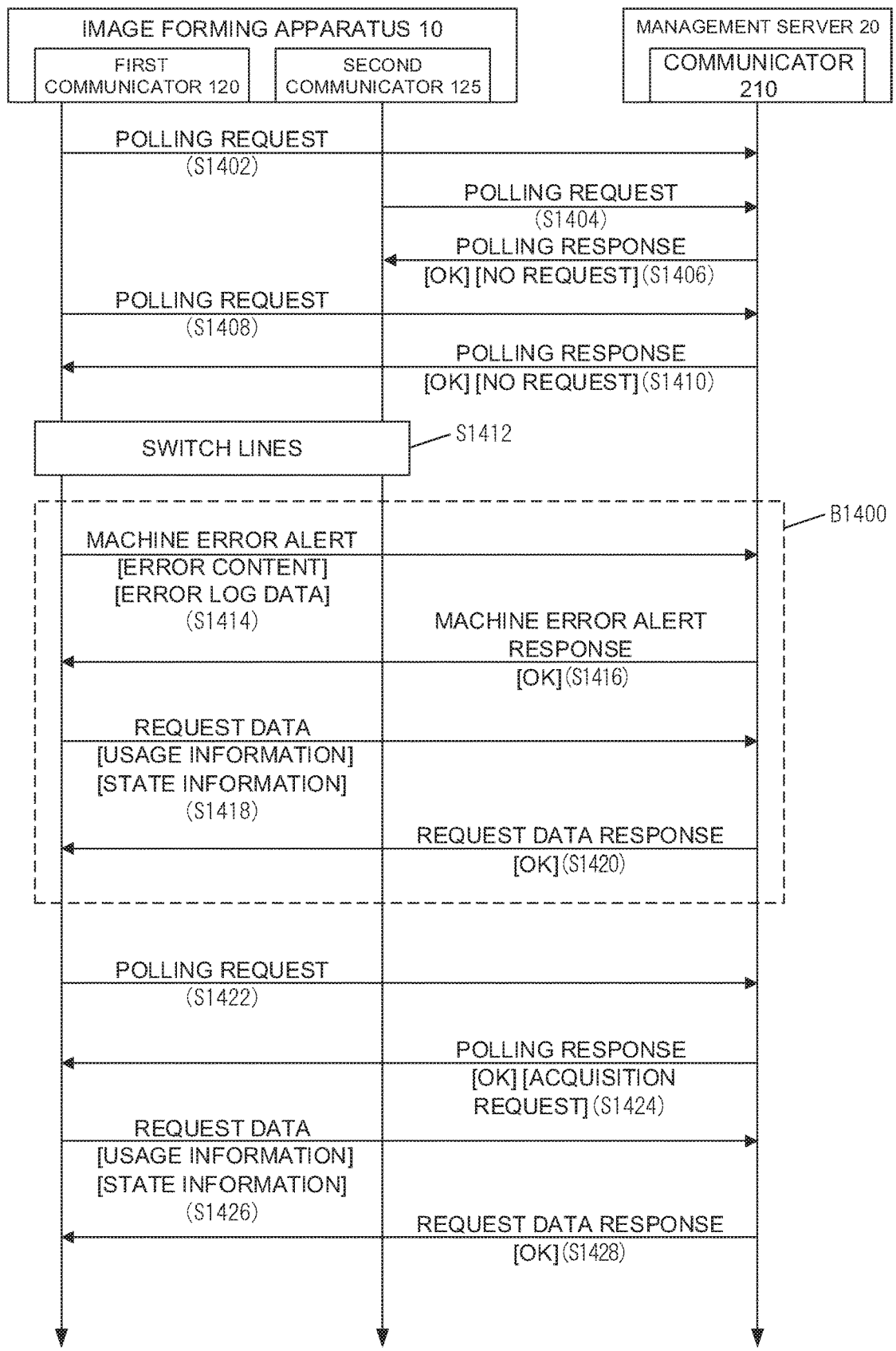
FIG. 14 is a sequence chart illustrating an operation example according to the first embodiment.

In the processing which the forming apparatus 10 transmits the untransmitted data to the management server 20, specifically, the processing indicated by B1400 in FIG. 14 is executed. In receiving information such as the error log data or error content from the untransmitted data processor 112, the data generation processor 110 generates a machine error alert including the received data. The command transmitter and receiver 106 transmits the generated machine error alert to the management server 20 via the first communicator 120 (S1414). The command transmitter and receiver 106 receives a machine error alert response from the management server 20 via the first communicator 120 (S1416).

If the untransmitted data includes state information, the untransmitted data processor 112 transmits the state information to the data generation processor 110. At this time, the untransmitted data processor 112 may also transmit the transmitted usage information to the data generation processor 110.

In receiving the state information and the usage information from the untransmitted data processor 112, the data generation processor 110 generates request data including the received data. The command transmitter and receiver 106 transmits the generated request data to the management server 20 via the first communicator 120 (S1418). The command transmitter and receiver 106 receives a request data response from the management server 20 via the first communicator 120 (S1420).

As a result of the processing of the untransmitted data processor 112 described above, the image forming apparatus 10 transmits the untransmitted data to the management server 20. The management server 20 receiving the untransmitted data may store the untransmitted data received from the image forming apparatus 10 as is, or may store the untransmitted data in association with data already received from the image forming apparatus 10.

After the communicator that communicates with the management server 20 is switched to the first communicator 120, the command transmitter and receiver 106 transmits a polling request to the management server 20 via the first communicator 120 (S1422). If receiving a polling response including a parameter of an acquisition request (S1424), the command transmitter and receiver 106 transmits request data to the management server 20 via the first communicator 120 (S1426). It is noted that the communication with the management server 20 is performed via the first communicator 120, and thus, the command transmitter and receiver 106 does not select data to be included in the request data. The command transmitter and receiver 106 receives a request data response from the management server 20 via the first communicator 120 (S1428).

In the present embodiment, when communicating with the management server 20 through the user shared line via the second communicator 125, the image forming apparatus 10 transmits the first information having a smaller data amount than the second information, but may also transmit the second information. In this case, when the line error occurring in the service dedicated line is resolved, the image forming apparatus 10 is only required to transmit the first information to the management server 20 via the first communicator 120 through the service shared line.

When transmitting error log data as untransmitted data, the untransmitted data processor 112 may suppress the transmission of a machine error alert regarding a resolved machine error. For example, the service dedicated line error has already been resolved when the line error occurring in the service-dedicated line is resolved. Therefore, the untransmitted data processor 112 does not transmit untransmitted data (for example, error log data) regarding the service dedicated line error to the data generation processor 110, in step S176 of the untransmitted data transmission process. Thus, it is possible to suppress the data amount of the information transmitted to the management server 20.

In the description of the present embodiment, the untransmitted data is stored in the transmission history information; however the present embodiment is not limited thereto. For example, the image forming apparatus 10 stores the usage information and the state information in association with a time when the information is stored as well as usage information and state information at that time. The command transmitter and receiver 106 notifies the untransmitted data processor 112 when untransmitted data occurs. In receiving a line switching notification from the line selector 104, the untransmitted data processor 112 extracts data not transmitted to the management server 20 from the usage information storage area 182 and the state information storage area 184, based on a timing when the notification is received from the command transmitter and receiver 106. The untransmitted data processor 112 transmits the extracted data to the data generation processor 110. Thus, it is no longer necessary to store the usage information or the state information not transmitted to the management server 20 as the transmission history information.

The error log data may also not be stored in the transmission history information. For example, if the error log data is stored as a part of the log data, the untransmitted data processor 112 extracts the error log data not transmitted to the management server 20 from the log data, based on the timing when the notification is received from the command transmitter and receiver 106. The untransmitted data processor 112 transmits the extracted error log data to the data generation processor 110.

If the error log data is stored in the storage 180 separately from the log data, information for identifying the error log data (for example, a file name or a search key for searching the error log data) may be stored instead of the error log data in the transmission history information. The untransmitted data processor 112 identifies the untransmitted error log data, based on the information for identifying the untransmitted error log data at a timing when the notification is received from the command transmitter and receiver 106, and transmits the identified error log data to the data generation processor 110.

As described above if the image forming apparatus 10 has a configuration that enables the identification of the untransmitted data without storing the untransmitted data in the transmission history information, it is possible to realize a processing similar to the processing described in the present embodiment. if the untransmitted data is not stored in the transmission history information, it is possible to reduce the data capacity to be stored in the storage 180.

According to the present embodiment, even if there is data not transmitted to the management server due to the restriction provided with the purpose of reducing the amount of data transmitted through the user shared line in the image forming apparatus of the present embodiment, it is possible to transmit the data to the management server after the recovery of the service dedicated line. Therefore, in a system including the image forming apparatus according to the present embodiment, it is possible for the management server to appropriately receive information from the image forming apparatus even if a line error occurs in the service dedicated line.

2. Second Embodiment

Next, a second embodiment will be described. Unlike the first embodiment, in the second embodiment, if the untransmitted data includes a plurality of pieces of information, the plurality of pieces of information is transmitted according to a set priority.

In the present embodiment, the untransmitted data processor 112 sets a priority to the information included in the untransmitted data before executing the processing in step S176 of FIG. 7, in the untransmitted data transmission process. In step S176, the untransmitted data processor 112 selects the information to be transmitted to the data generation processor 110, based on the priority. Thus, it is possible to transmit the information included in the untransmitted data to the management server 20 in descending order of the priority.

In the present embodiment, the untransmitted data processor 112 sets the priority in the units described below.

(1) Type of Information Included in Untransmitted Data

The usage information and the state information may include a plurality of pieces of information. For example, the usage information may include the total number of images formed and the number of images formed for each type of color mode. The state information may include log data, a usage status, defect prediction data, operation information, setting values, firm data, and the like.

At this time, the untransmitted data processor 112 sets a higher priority to such a type of information in which immediacy is important, such as information that must be in the latest state and information indicating that a user of the management server 20 needs to take some action For example, as for the information included in the usage information, the untransmitted data processor 112 sets a higher priority to information about the total number of images formed, and a lower priority to information about the number of images formed for each color mode type. As for the information included in the state information, the untransmitted data processor 112 sets a higher priority to defect prediction data, followed by operation information, a setting value, firm data, and log data, this order.

Depending on the type of information, a plurality of pieces of information may be included in time series, and, for example, the operation information may include the latest operation information and the past operation information. In such a case, the untransmitted data processor 112 may set a higher priority to the later information.

If a type of information needs to be time-series information, the untransmitted data processor 112 may set a high priority to the past information related to the latest information. For example, if defect prediction data includes a plurality of pieces of information including a sensor value and a date and time when the value is detected, the untransmitted data processor 112 may set a high priority to the most recent information (for example, the most recent 10 cases) including the latest information. Specifically, if a defect due to a temperature rise or the like is predicted, the untransmitted data processor 112 sets a high priority to information about the most recent 10 cases of internal temperature of the image forming apparatus 10 (information about the latest temperature and information about the most recent 9 cases of past temperatures). Thus, the image forming apparatus 10 can transmit information about the transition in sensor value such as the transition of the temperature, to the management server 20.

If such a priority is set, information such as the total number of images formed and information such as the defect prediction data are preferentially transmitted to the management server 20. Therefore, when the service dedicated line is normal, a user of the management server 20 can preferentially check information in which immediacy is important, such as information which is included in the untransmitted data and is to always be transmitted, and information for which some action is required.

(2) Transmission History Information

The untransmitted data processor 112 sets the priority for each transmission history inform on unit. For example, if the transmission history information storage area 188 stores a plurality of pieces of transmission history information with the command data as "request data", the untransmitted data processor 112 sets a higher priority to the transmission history information with a more recent transmission date and time.

If the transmission history information storage area 188 stores a plurality of pieces of transmission history information with the command data as "machine error alert", the untransmitted data processor 112 sets the priority in accordance with a machine error type. For example, the untransmitted data processor 112 sets a high priority to an important machine error that needs to be dealt with by an administrator of the image forming apparatus 10, a user of the management server 20, or the like, and a low priority to a machine error to be dealt with by a user of the image forming apparatus 10. Thus, it is possible for the image forming apparatus 10 to preferentially transmit a machine error alert regarding an important machine error. Therefore, when the service dedicated line is in a normal state, a user of the management server 20 can preferentially check information on machine errors for which immediacy is important, such as information for which some action is required.

(3) Combination of (1) and (2)

The untransmitted data processor 112 may a priority for each piece of transmission history information and for each type of information included in the untransmitted data.

To which unit the priority is to be set, and based on what standard the priority is to be set may be set by a user or may be set in advance. A method other than the above method of setting the priority may be employed, and the priority may be set based on a predetermined standard, such as the priority set in ascending order of the amount of data transmitted to the management server 20.

According to the present embodiment, when the service dedicated line is in a normal state and communication is performed via the first communicator the image forming apparatus transmits untransmitted data in accordance with the priority, in an order starting from information with the highest priority. Therefore, the image forming apparatus can reduce the amount of data when untransmitted data is transmitted to reduce loads on the service dedicated line and the management server.

If a higher priority to information in which immediacy is important is set, even when untransmitted data is sequentially transmitted, it is possible for the image forming apparatus to preferentially transmit the information in which immediacy is important, to the management server. Therefore, a user of the management server can know information that must be in the latest state, or information indicating that some action required at an early stage after a line error occurring in the service dedicated line is resolved, and a failure in the first communicator is resolved.

3. Third Embodiment

Next, a third embodiment will be described. In the third embodiment, the line error determiner 102 measures a time period from when it is determined that a line error occurs in the service dedicated line to a time when it is determined that the service dedicated line is normal, and transmits the measured time period to the management server 20. In the present embodiment, FIG. 3 in the first embodiment is replaced with FIG. 15. It is noted that the same numeral or symbol is attached to the same functional element and process, and description of the duplicated part is omitted.

Figure 15:
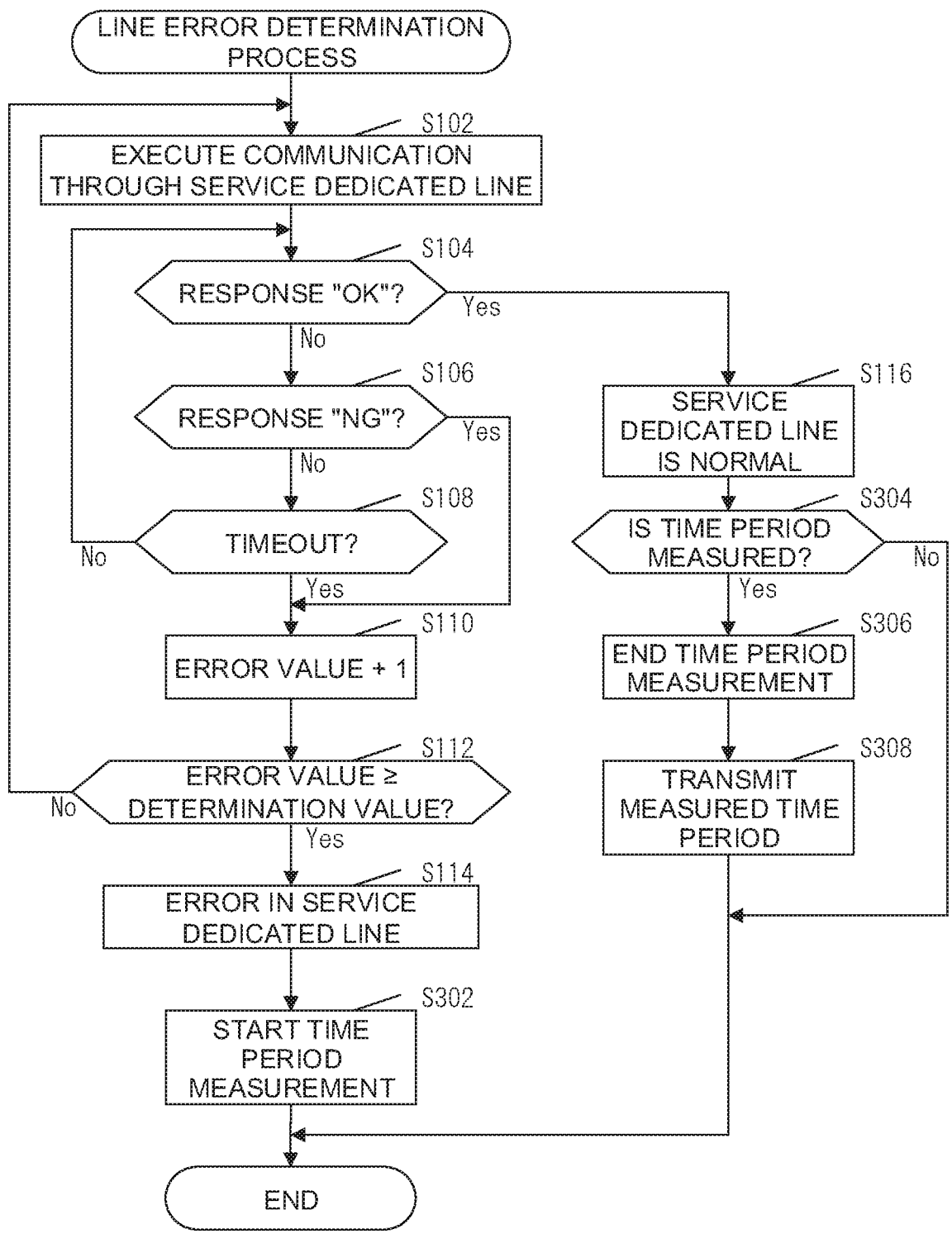
FIG. 15 is a flowchart for describing a flow of a line error determination process according to a third embodiment.

A line error determination process realized by the line error determiner 102 in the present embodiment will be described with reference to FIG. 15. In determining that a line error occurs in the service dedicated line, that is, in determining that a failure occurs in the first communicator 120, the line error determiner 102 starts time period measurement (step S302).

After determining that the service dedicated line is normal, the line error determiner 102 determines whether a time period is measured (step S304). If a time period is measured, the line error determiner 102 ends the time period measurement and transmits the measured time period to the management server 20 (step S306→step S308). Thus, the line error determiner 102 ends the time period measurement started when it is determined that a failure occurs in the first communicator 120, at the time when it is determined that the failure occurring in the first communicator 120 is resolved. Therefore, the time period measured as a result of the time period measurement represents a time period during which the failure occurs in the first communicator 120 (a time period during which the user shared line is used for transmitting data to the management server 20).

A method of transmitting the measured time period to the management server 20 is realized by, for example, transmitting a command for notifying a time period during which the line error occurs in the service dedicated line to the management server 20. In this case, the line error determiner 102 transmits information on the measured time period to the data generation processor 110. The data generation processor 110 generates a command including the information about the time period received from the line error determiner 102 and transmits the command to the command transmitter and receiver 106. The command transmitter and receiver 106 transmits the command via the first communicator 120. Thus, information of a time period from a time point when it is determined that a line error occurs in the service dedicated line to a time point when it is determined that the service dedicated line is normal is transmitted to the management server 20. Based on the received command, the management server 20 knows a period during which the service dedicated line can not be used, that is, a time period during which the user shared line is used in the communication between the image forming apparatus 10 and the management server 20.

According to the present embodiment, the image forming apparatus transmits, to the management server, a time period during which a failure occurred in the first communicator, that is, a time period from a time when it is determined that a line error occurs in the service dedicated line to a time when it is determined that the line error occurring in the service dedicated line is resolved. Therefore, in the system including the image forming apparatus according to the present embodiment, the management server knows a time period during which the user shared line is used, based on the information on the time received from the image forming apparatus. Moreover, an administrator or the like of the system including the image forming apparatus according to the present embodiment may use the information on the time period transmitted to the management server for reimbursement (refund or the like) for a time period during which the user shared line is borrowed. Therefore, the administrator or the like of the system including the image forming apparatus according to the present embodiment can improve the service level of the system.

4. Modification

The present invention is not limited to the above embodiments, and can have various modifications. That is, embodiments obtained by combining technical means appropriately changed within the scope not departing from the gist of the present invention are also included in the technical scope of the present invention.

Although the above-described embodiments have portions described separately for convenience of description, it is needless to say that the embodiments may be combined and executed within a technically possible range. For example, if the second embodiment and the third embodiment in combination are executed, it is possible for the image forming apparatus 10 to transmit, to the management server 20, a plurality of pieces of information included in the untransmitted data, based on the priority, and also transmit a time period during which the service dedicated line can not be used.

In addition, a program operating in each of the devices in the embodiments is a program (a program for causing a computer to function) for controlling a CPU and the like to realize the functions of the above-described embodiments. Information processed by these devices is temporarily stored in a temporary storage device (such as a RAM) at the time of processing the information, and then stored in storage devices such as various types of read only memories (ROMs) and HDDs, and read or corrected and written by the CPU, as necessary.

Here, examples of a storage medium for storing the program may include a semiconductor medium (such as a ROM and a non-volatile memory card), an optical recording medium/magneto-optical recording medium (such as a digital versatile disc (DVD), a magneto optical disc (MO), a mini disc (MD), a compact disc (CD), and a Blu-ray Disk (BD)), and a magnetic recording medium (such as magnetic tape and a flexible disk). If the loaded program is executed, not only the functions of the above-described embodiments may be realized, but also the functions of the present invention may be realized as a result of performing processing in cooperation with an operating system, another application program, or the like, based on instructions of the program and performed.

If the program is distributed to a market, the program may be stored in a portable recording medium to be distributed, or the program may be transferred to a server computer connected via a network such as the Internet. In this case of course, a storage device of the server computer is also included in the present invention.

DESCRIPTION OF REFERENCE NUMERALS

1 System
10 Image forming apparatus

100 Controller
102 Line error determiner
104 Line selector
106 Command transmitter and receiver
108 Event reception processor
110 Data generation processor
112 Untransmitted data processor
120 First communicator
125 Second communicator
130 Image reader
135 Image processor
140 Image former
150 Display
160 Operation inputter
170 Sensor device
180 Storage
182 Usage information storage area
184 State information storage area
186 Setting information storage area
188 Transmission history information storage area
190 Image data storage area
20 Management server
200 Controller
210 Communicator
220 Display
230 Operation inputter
240 Storage
242 Usage information storage area
244 State information storage area
246 Error information storage area
248 Image forming apparatus management table

What is claimed is:

1. An image forming apparatus comprising: a controller; a communicator that communicates with a management servers and an image former that forms an image, wherein
the communicator includes a first communicator and a second communicator, and
the controller:
transmits first information about a use of the image forming apparatus and second information about a state of the image forming apparatus to the management server via the first communicator;
transmits either one of the first information or the second information to the management server via the second communicator if a failure occurs in the first communicator; and
transmits the other information via the first communicator if the failure occurring in the first communicator is resolved.

2. The image forming apparatus according to claim 1, wherein the first communicator and the second communicator are connected to networks different from each other.

3. The image forming apparatus according to claim 1, wherein the controller:
determines that the failure occurs if a response indicating that communication is executed normally is not received from the management server when the first information and the second information are transmitted to the management server via the first communicator;
regularly communicates with the management server via the first communicator after determining that the failure occurs; and
determines that the failure is resolved if a response indicating that communication is executed normally is received from the management server.

4. The image forming apparatus according to claim 1, wherein the other information includes a plurality of pieces of information to which a priority is set, and
the controller transmits, via the first communicator, the plurality of pieces of information included in the other information in descending order of the priority.

5. The image forming apparatus according to claim 4, wherein the controller sets the priority in descending order of immediacy for performing transmission to the management server.

6. The image forming apparatus according to claim 3, wherein the controller transmits, to the management server, a time period from a time when it is determined that the failure occurs to a time when it is determined that the failure is resolved.

7. An image forming apparatus comprising: a controller; a communicator that communicates with a management server; and an image former that forms an image, wherein
the communicator includes a first communicator and a second communicator, and
the controller:
transmits an error content of the image forming apparatus and error log data of the image forming apparatus to the management server via the first communicator;
transmits either one of information of the error content of the image forming apparatus or the error log data of the image forming apparatus to the management server via the second communicator if a failure occurs in the first communicator; and
transmits the other information via the first communicator if the failure occurring in the first communicator is resolved.

8. A method of controlling an image forming apparatus including:
a controller; a communicator that communicates with a management server; and an image former that forms an image,
the communicator including a first communicator and a second communicator, the control method comprising:
transmitting first information about a use of the image forming apparatus and second information about a state of the image forming apparatus to the management server via the first communicator;
transmitting either one of the first information or the second information to the management server via the second communicator if a failure occurs in the first communicator; and
transmitting the other information via the first communicator if the failure occurring in the first communicator is resolved.

9. A method of controlling an image forming apparatus including: a controller; a communicator that communicates with a management server; and an image former that forms an image,
the communicator including a first communicator and a second communicator, the method comprising:
transmitting an error content of the image forming apparatus and error log data of the image forming apparatus to the management server via the first communicator;
transmitting either one of information of the error content the image forming apparatus or the error log data of the image forming apparatus to the management server via the second communicator if a failure occurs in the first communicator; and transmitting the other information via the first communicator if the failure occurring in the first communicator is resolved.

\* \* \* \* \*